United States Patent [19]

Coaker et al.

[11] Patent Number: 5,036,121

[45] Date of Patent: Jul. 30, 1991

[54] FLAME AND SMOKE RETARDANT CABLE INSULATION AND JACKETING COMPOSITIONS

[75] Inventors: A. William M. Coaker, North Olmsted; Josef C. Vyvoda, Avon Lake, both of Ohio

[73] Assignee: The B. F. Goodrich Company, Akron, Ohio

[21] Appl. No.: 241,163

[22] Filed: Sep. 6, 1988

[51] Int. Cl.[5] .......................... C08K 5/34; C08K 5/12

[52] U.S. Cl. .............................. 524/100; 174/110 V; 524/288; 524/411; 524/412; 428/378; 428/379

[58] Field of Search ............... 524/424, 425, 436, 437, 524/406, 398, 411, 412, 399, 288, 141, 143, 100; 428/378, 379; 174/110 V; 525/331.6, 334.1, 222, 331.5, 317

[56] References Cited

U.S. PATENT DOCUMENTS

| | | | |
|---|---|---|---|
| 3,268,623 | 8/1966 | Beer | 260/876 |
| 3,283,035 | 11/1966 | Schnebelen | 525/222 |
| 3,297,792 | 1/1967 | Coaker et al. | 525/317 |
| 3,322,857 | 5/1967 | Coaker et al. | 260/876 |
| 3,845,001 | 10/1974 | Mitchell | 524/413 |
| 3,845,166 | 10/1974 | Betts et al. | 260/897 C |
| 3,872,041 | 3/1975 | Koerber | 260/23 |
| 3,940,456 | 2/1976 | Frey et al. | 260/897 C |
| 3,983,290 | 9/1976 | Elcik | 428/285 |
| 4,053,451 | 10/1977 | Kroenke et al. | 524/100 |
| 4,129,535 | 12/1978 | Elcik | 524/411 |
| 4,147,690 | 4/1979 | Rich | 524/437 |
| 4,216,139 | 8/1980 | McRowe | 260/45.75 C |
| 4,280,940 | 7/1981 | Klug et al. | 260/23 XA X |
| 4,298,517 | 11/1981 | Sandler | 524/437 |
| 4,360,624 | 11/1982 | Huang et al. | 524/411 |
| 4,401,845 | 9/1983 | Odhner et al. | 174/113 R |
| 4,464,495 | 9/1984 | Brown | 524/87 |
| 4,556,694 | 12/1985 | Wallace | 525/239 |
| 4,579,907 | 4/1986 | Wildenau et al. | 525/222 |
| 4,605,818 | 8/1986 | Arroyo et al. | 174/107 |
| 4,670,494 | 6/1987 | Semenza | 524/437 |
| 4,892,683 | 1/1990 | Naseem | 252/609 |

FOREIGN PATENT DOCUMENTS

| | | |
|---|---|---|
| 3204144 | 8/1983 | Fed. Rep. of Germany . |

*Primary Examiner*—Veronica P. Hoke
*Attorney, Agent, or Firm*—Thoburn T. Dunlap

[57] ABSTRACT

Flexibilized vinyl halide polymers and copolymers having improved flame retarding and smoke suppressing as well as physical and electrical properties are described. The compositions are characterized by an unusual combination of ingredients comprising a base polymer flexibilized with chlorinated polyethylene, flame and/or smoke suppressants, stabilizers and plasticizers. The compositions exhibit improved flame and smoke suppression and low brittleness temperature over that of conventional fire and smoke suppressed PVC.

22 Claims, 8 Drawing Sheets

FLAME AND SMOKE RETARDANT CABLE INSULATION AND JACKETING COMPOSITIONS

BACKGROUND OF THE INVENTION

1. Technical Field

This invention is directed to polymeric compositions having improved resistance to flame spread and smoke evolution as well as improved physical properties. Such compositions are useful in forming primary insulation and protective jacketing for electrical conductors such as wire and cable, and are also suitable for buffering optical fiber. More particularly, this invention relates to flame and smoke resistant vinyl halide polymers having reduced rates of heat and smoke release and improved low temperature impact properties and dynamic thermal stabilities.

2. State of the Art

Because of today's need for the instantaneous transmission of data and information, reliance upon computer, word processing, electronic data transmission, sensor and telecommunications equipment is increasing at a phenomenal pace. The advent of technology is making it possible to interface and network this equipment, leading to the development of integrated communications systems. Such systems are increasingly installed in confined areas such as in high rise buildings, watercraft, aircraft, trains, drilling platforms and in mines. In order to link these electronic components, it is necessary to install thousands of feet of wire and cable throughout these structures and areas. Typically, it is a convenient practice to install the wire and cable through air handling plenums and wire and cable raceways. Because plenums and raceways are continuous throughout these installations, it is essential for safety that the insulation and jacketing materials have low flame spreading and smoke evolving properties as well as diverse physical properties for performance under a variety of hostile environmental conditions.

Polyvinyl chloride (PVC) has traditionally been the material of choice for wire and cable insulation because of its inherent flame resistant properties. PVC is well-known to be one of the least ignitable of the polymeric materials and once ignited it is one of the least flammable. Other desirable attributes include mechanical toughness, resistance to chemical corrosion, and good dielectric properties. Additionally, PVC is relatively low in cost. A drawback, however, is that PVC is a rigid thermoplastic that lacks flexibility. Upon exposure to temperature extremes, PVC loses its resistance to high heat distortion and low temperature brittleness. Another disadvantage is that PVC is highly viscous at processing temperatures without the use of plasticizing additives, and is therefore difficult to compound and process. Accordingly, plasticizers are added to PVC during processing to improve the processing characteristics and the flexibility of the end product. However, the use of plasticizers in wire and cable insulation applications is limited in that, plasticizers reduce the flame resistance, increase smoke evolution and impair the dielectric properties of the insulating material.

In order to overcome some of these disadvantages, it is known to blend PVC with chlorinated polyolefins and more particularly chlorinated polyethylene (CPE). For example, U.S. Pat. No. 3,845,166 discloses a wire and cable insulation composition comprising PVC, a chlorinated polyolefin, polyethylene and a crosslinking agent. This thermosetting composition may additionally contain various additives such as pigments, antioxidants, stabilizers and the like.

U.S. Pat. No. 4,129,535 discloses fire retardant PVC film compositions. The films comprise a blend of PVC, chlorinated polyethylene, a phosphate ester plasticizer, a magnesium hydroxide filler as well as zinc borate and antimony trioxide fire retardants.

In U.S. Pat. No. 4,280,940 there is disclosed a thermoplastic composition comprising PVC and a mixture of two differently chlorinated polyethylenes. The composition may additionally contain additives such as heat and light stabilizers, UV absorbers, lubricants, plasticizers, pigments and antistatic agents.

U.S. Pat. No. 4,556,694 discloses a method for improving the low temperature properties of PVC by adding a chlorosulfonated polyethylene and a chlorinated polyethylene. This patent teaches a synergistic effect between the CPE and chlorosulfonated polyethylene is necessary to achieve improved low temperature brittleness properties.

However, these compositions are lacking in that a combination of superior flame and smoke suppression and good low temperature performance, e.g., brittleness temperature, are not achieved. In addition, dynamic thermal stability (DTS) at medium and high shear rates is poor for the aforementioned compositions.

Another method being utilized to provide fire resistance to insulated wire and cable involves surrounding the insulated primary conductors with fire retardant jacketing materials. U.S. Pat. No. 4,401,845 discloses a cable comprised of a bundle of conductors which are insulated with a coating of poly (vinylidene fluoride)(PVDF), a sheath of poly (tetrafluoroethylene) (PTFE) impregnated glass wrap surrounding the bundle of insulated conductors and an outer protective jacket of PVDF. Although fluoropolymers have good resistance to flame and smoke spread, the inherently high dielectric constant of PVDF renders it unsuitable for many applications, such as, for example, in primary insulation for wire used in telecommunications cable. Moreover, fluoropolymers are relatively expensive.

Some of the disadvantages of prior fluoropolymer cable insulation construction have been overcome with the advent of PVC/PTFE/PVDF insulated cable construction. In U.S. Pat. No. 4,605,818 there is disclosed a cable construction comprising at least one conductor which is insulated with PVC coating, a sheath of woven glass impregnated with PTFE, and an outer protective jacket of PVDF. Although this cable construction provides good dielectric, flame and smoke resistant properties, there still is a need for wire and cable insulation with improved flame and smoke resistance.

As more stringent fire and safety standards are enacted, wire and cable insulation will require enormously improved fire and smoke performance while maintaining superior physical properties. There is therefore a need for a low cost wire and cable insulation composition having improved flame spread and smoke evolution characteristics while simultaneously having superior physical properties.

SUMMARY OF THE INVENTION

Accordingly, it is the object of this invention to provide an insulating and jacketing compound that exhibits superior flame and smoke resistance while maintaining good physical properties, and which is easily processable by normal manufacturing methods at a relatively low cost.

It is another object of this invention to provide a flame resistant insulation and jacketing material which is durable under a wide range of environmental conditions.

It is a further object of this invention to provide an insulating and jacketing composition having improved low temperature brittleness properties.

A still further object of this invention is to provide an insulating and jacketing composition with superior dynamic thermal stability.

It is another object of this invention to provide a flame resistant polyvinyl chloride composition which may be readily extruded onto an electrical conductor.

It is still a further object of this invention to provide a flame resistant jacketing material for cable.

Another object of this invention is to provide a wire and cable insulation and jacketing material having a high oxygen index, low rate of heat release and low smoke obscuration.

Yet a further object of this invention is to provide methods for preparing a wire and cable insulation and jacketing composition having superior flame resistance, physical properties, electrical properties and processability.

These and other objects are accomplished herein by an insulating composition comprising:

a) a base polymer;
b) a flexibilizing agent(s);
c) a stabilizer(s);
d) a flame retardant(s);
e) a smoke suppressant(s);
f) a plasticizer(s); and optionally
g) specific flame retarding and/or smoke suppressing fillers, processing aids and antioxidants; said composition having the following properties:
  (i) cumulative heat released at flux 20 kW/m$^2$ prior to 15 min. of less than 100 MJ/m$^2$ as measured by the OSU rate of heat release (RHR) calorimeter;
  (ii) cumulative smoke released at flux 20 kW/m$^2$ prior to 15 min. of less than 400 SMK/m$^2$ as measured by the OSU rate of heat release (RHR) calorimeter.

The compositions of the present invention comprise, in intimate admixture, the foregoing ingredients in an unique combination and proportion. The present compositions are unique in that they possess a combination of ingredients and properties never before attempted or attained in the prior art.

DETAILED DESCRIPTION OF THE INVENTION

Base Polymer

Figure 1:
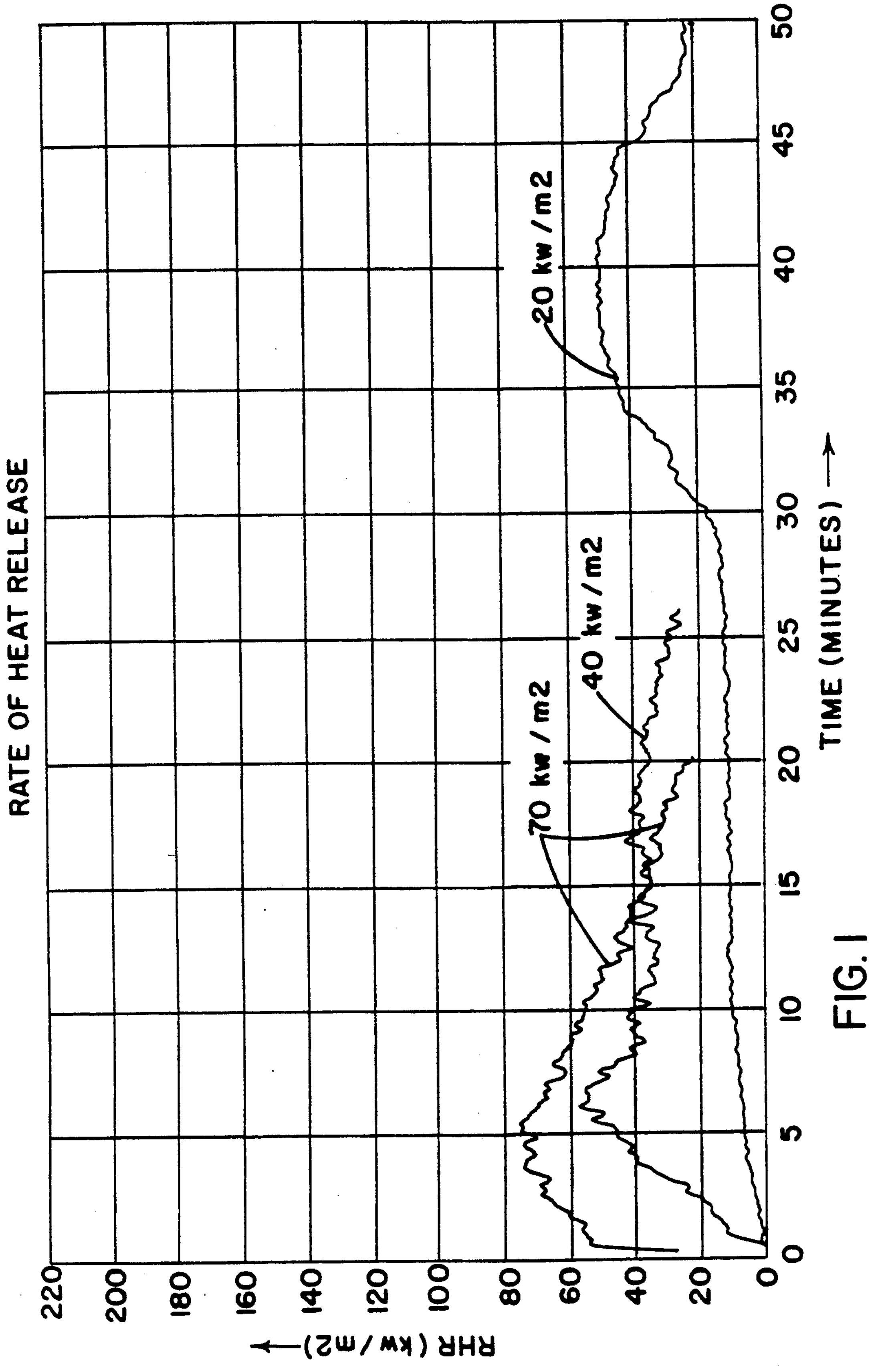
FIG. 1 illustrates the rate of heat release (RHR) at heat fluxes of 20, 40 and 70 kW/m$^2$ for the composition of Example 13.

The base polymers utilized in this invention include vinyl halide homopolymers (e.g. PVC), copolymers and blends of homopolymers and/or copolymers. Useful vinyl halides include vinyl chloride and vinylidene chloride polymers that may contain up to about 50 percent by weight (in the case of graft copolymers) and 25 percent by weight (in the case of random copolymers) of at least one other vinylidene monomer (i.e., a monomer containing at least one terminal $CH_2{=}C{<}$ group) per molecule copolymerized therewith. Suitable comonomers include, for example, vinylidene chloride, vinyl acetate, ethyl acrylate, propyl acrylate, butyl acrylate, hexyl acrylate, octyl acrylate, 2-ethyl hexyl acrylate, nonyl acrylate, decyl acrylate, phenyl acrylate, nonylphenyl acrylate, ethyl methacrylate, butyl methacrylate, hexyl methacrylate, 2-ethyl hexyl methacrylate, methoxy-acrylate, butoxyethyl acrylate, ethoxypropyl acrylate, 2 (2-ethoxyethoxy) ethyl-acrylate and the like. Especially preferred acrylate monomers include butyl acrylate, 2-ethylhexyl acrylate, ethyl acrylate, and the like.

The term vinyl halide as used herein also includes chlorinated poly-vinyl chloride. Methods for chlorinating polyvinyl chloride polymers are well-known. Such methods are disclosed in U.S. Pat. Nos. 2,996,489, 3,167,535 and 4,039,732. Normally the PVC is chlorinated until it contains about 65 to 70 weight percent chlorine, although the chlorine content may be as high as 73 percent, or lightly chlorinated as desired, for example, 58 to 64 percent by weight chlorine content.

FLEXIBILIZING AGENT

The flexibilizing agent or flexibilizers utilized in the present invention serve to enhance certain physical properties of the composition such as flexibility at low temperatures and elongation properties measured at ambient temperature. The flexibilizers useful in this invention include chlorinated polyethylene (CPE), copolymers of ethylene/vinyl acetate (EVA), and terpolymers of ethylene/vinyl acetate/carbon monoxide (E/VA/CO) or mixtures thereof. The E/VA/CO terpolymers consist of, by weight, 40–80% ethylene, 5–57% vinyl acetate and 3–30% carbon monoxide. Such terpolymers are commercially available from E.I. DuPont de Nemours & Co., under the ELVALOY® trademark. The EVA copolymers utilized in the present invention are well-known in the art and such are prepared by methods known to those skilled in the art to contain from 5 to 70 weight percent of vinyl acetate copolymerized with ethylene. Preferably, for the purposes of this invention, the EVA copolymers will contain from about 25% to about 60% weight percent vinyl acetate.

Chlorinated polyethylene is the preferred flexibilizer. The CPE may be made from linear or branched polyethylene, and desirably contains from about 22 to 60 percent by weight of chlorine depending upon the dispersion means utilized. CPE may be prepared by any of the methods conveniently used for the chlorination of polyethylenes (i.e., by chlorination of the polymer in solution, in aqueous dispersion, or in dry form.) Particularly suitable are the chlorination products of low and medium density polyethylenes. The type of CPE utilized will depend upon the method employed to blend the CPE with the base polymer (i.e., by mechanical blending or by homogeneous polymerization). Such methods will be described herebelow.

Flexibilizer blends containing more than one flexibilizer are also contemplated within the scope of this invention. For example, CPE and EVA may advantageously be used together. As to the proportion of CPE to EVA, good results have been obtained at 4:1 to 1:4 CPE:EVA ratios. The ratio of CPE to EVA, if such blends are desired, will depend upon the amount of filler used in the composition. Generally, higher amounts of filler loadings will benefit from a greater proportion of EVA in the blend in order to sufficiently wet the filler material to achieve a readily processable composition.

In addition, filler wetting is enhanced by using lower molecular weight flexibilizers and polymerization under conditions which favor formation of lower molecular weight PVC, without going so far in this direction so as to impair the physical properties of the final product.

The amounts of flexibilizer that may be blended with the base polymer or homogeneously polymerized base polymer will range from about 10 phr to about 100 phr by weight of the base polymer resin and preferably from about 20 phr to about 70 phr. As previously stated, the base polymers of the present invention may be flexibilized by either one of two methods. Such methods will now be described.

METHOD A

Mechanical Blending

In one embodiment, the base polymer is mechanically blended with the flexibilizer prior to extrusion. The base polymer resin and flexibilizer resin are mixed thoroughly in powdered form in an intensive powder blender such as a Henschel mixer or the like. Following the intimate blending of the base polymer and flexibilizer, the flexibilized base polymer is further blended with the remaining ingredients called for by the recipe followed by melt blending of the dry blend, for instance, in a Banbury mixer or the like.

The preferred base polymer resin utilized in this method is PVC. PVC resins may be prepared by any suitable method known to the art with a suspension type resin being the preferred choice. Suitable suspension resins are commercially available, such as, for example, the GEON® vinyl resins manufactured and sold by The BFGoodrich Company. Particularly preferred are resins such as GEON® 110X426FG and GEON®30 suspension resins having inherent viscosity ranges from about 0.85 to 1.0. The inherent viscosity is measured in accordance with ASTM procedure No. D-1243-79 (reapproved 1984).

The preferred flexibilizer of this embodiment is the CPE. Two major types of CPE that may preferably be utilized are the heterogeneously chlorinated polyethylenes and the solution chlorinated polyethylenes. The heterogeneously chlorinated polyethylenes have a broad distribution of chlorine content characterized by an average chlorine percentage by weight. The average chlorine content of the heterogeneously chlorinated CPE may vary between 25 and 42 percent by weight, or higher. Preferably a CPE resin having an average chlorine content of about 36% is utilized in this embodiment. Suitable heterogeneously chlorinated CPE's are commercially available from Dow Chemical Company under the TYRIN® trademark. Representative TYRIN resins and elastomers are set forth below.

| | Designation | | | | | |
|---|---|---|---|---|---|---|
| Properties | 2552 | 3611 | 3614A | 3623A | 4213 | CM0136* |
| Chlorine content (% by weight) | 25 | 36 | 36 | 36 | 42 | 36 |
| Specific Gravity | 1.08 | 1.16 | 1.16 | 1.16 | 1.22 | 1.16 |
| Melt Viscosity +KP (poises/1000) | 13.0 | 8.0 | 21.5 | 17.5 | 18.5 | 21.6 |

*elastomer grade

+ Melt Viscosities measured in KP @ 190° C. and 150 sec −1 shear rate.

The most preferred CPE resin is made by the solution chlorination of polyethylene. Solution chlorinated polyethylene has a relatively narrow distribution of chlorine content in each resin product. The chlorine content may range from about 5 to about 45 percent by weight and preferably from about 33 to about 38 percent by weight. Viscosities as measured by the Mooney procedure may range from about 20 to about 110 ML (1+4) at 100° C. Suitable solution chlorinated CPE's are available from E.I. DuPont de Nemours & Co. under the HYPALON® trademark.

METHOD B

Homogeneous Polymerization

In this embodiment of the invention, the base polymer is formed in the presence of the flexibilizing agent, resulting in a homogeneous blend of base polymer and flexibilizer. Since homogeneity is achieved at the molecular level the base polymer and flexibilizer are relatively more compatible than mechanical blends, resulting in a composition with better physical properties for a given composition.

In a preferred embodiment, vinyl chloride monomer is polymerized in the presence of CPE, the resultant product is a mixture of 1) CPE/PVC graft copolymer, 2) PVC homopolymer and 3) unreacted CPE. Without wishing to be bound by a particular theory of invention, it is believed that the CPE/PVC graft copolymer functions as a compatibilizing agent between the PVC homopolymer and any CPE resin in the final composition.

In employing this method, the type of CPE utilized in the polymerization is critical. It is important that the CPE resin (or any other flexibilizer) be dispersible in vinyl chloride at polymerization temperatures. In this regard, the CPE should be of low molecular weight, e.g., made from a low molecular weight polyethylene, and preferably be highly branched, e.g., containing little or no crystallinity. The chlorine content of the CPE should generally range between 22 to 45 weight percent and preferably between 28 to 38 weight percent. It has been found that CPE made by solution chlorination works well in the present composition. The viscosity of the solution chlorinated CPE as measured by the Mooney procedure ML (1+4) at 100° C. may range from about 20 to about 115 and preferably from about 30 to about 55.

The flexibilized base polymer may be prepared by dissolving the CPE in vinyl chloride monomer and thereafter polymerizing the vinyl chloride. Although suspension polymerization is the preferred polymerization method, the polymerization may also be carried out by mass, solution or emulsion processes. The amount of vinyl chloride monomer utilized in the suspension process may range from about 60 to about 95 phm by weight and preferably from about 70 to about 90 phm by weight. The amount of CPE will range from about 5 to about 40 phm by weight and preferably from about 10 to about 30 phm by weight. For purposes herein the term phm (parts per hundred monomer) includes preformed polymer onto which monomers and expoxidized oils may graft during polymerization. The exact phm used in a particular polymerization recipe is adjusted to include minor amounts of other ingredients which are incorporated into the final polymer.

Suspension polymerization techniques are well-known in the art as set forth in the Encyclopedia of PVC, pp. 76–85, published by Marcel Decker, Inc. (1976) and need not be discussed in great detail here. Generally, the components are suspension-polymerized in an aqueous medium containing: 1) a suspending agent consisting of one or more water-soluble polymer substances such as polyvinyl alcohol, methyl cellulose, hydroxypropyl methyl cellulose, dodecylamine hydrochloride, sodium lauryl sulfonate, lauryl alcohol, sorbitan monolaurate polyoxyethylene, nonylphenoxy polyoxyethylene ethanol, polyethylene oxide containing surfactants and non-polyethylene oxide containing surfactants etc., partially hydrolyzed polyvinyl acetates, vinyl acetate-maleic anhydride or partially saponified polyalkyl acrylate or gelatine, and 2) a polymerization initiator.

Porosifiers and the like may be added for specific purposes where absorption into the polymer of liquid plasticizers to be added during blending is desired.

Suitable polymerization initiators are selected from the conventional free radical initiators such as organic peroxides and azo compounds. The particular free radical initiator will depend upon the monomeric materials being copolymerized, the molecular weight and color requirements of the copolymer and the temperature of the polymerization reaction. Insofar as the amount of initiator employed is concerned, it has been found that an amount in the range of about 0.005 part by weight to about 0.1 part by weight, based on 100 parts by weight of the comonomers being polymerized, is satisfactory. It is preferred to employ an amount of initiator in the range of about 0.01 part by weight to about 0.05 part by weight, based on 100 parts by weight of the comonomer components. Examples of suitable initiators include lauroyl peroxide, benzoyl peroxide, acetyl cyclohexyl sulfonyl peroxide, diacetyl peroxide, cumeme hydroperoxides, t-butyl peroxyneodecanoate, alpha-cumyl peroxyneodecanoate, t-butyl cumyl peroxyneodecanoate, t-butyl peroxypivalate, t-butyl peroxyacetate, isopropyldicarbonate, di-n-propyl peroxydicarbonate, disecondary butyl peroxydicarbonate, 2,2'-azobis-(2,4,-dimethyl valeronitrile), azobisisobutyronitrile, $\alpha$, $\alpha'$-azo-diisobutyrate and t-butyl perbenzoate, and the like, the choice depending on the reaction temperature.

The suspension polymerization process of this invention may be carried out at any temperature which is normal for the vinyl chloride monomer to be polymerized. A temperature range from about 0° C. to about 80° C. may be employed. Preferably, a temperature range from about 40° C. to about 70° C. may be employed with a range from about 50° C. to about 65° C. being the most preferable. So far as the temperature is within these ranges, it may be varied in the course of the polymerization. In order to facilitate temperature control during the polymerization process, the reaction medium is kept in contact with cooling surfaces cooled by water, brine, evaporation, etc. This is accomplished by employing a jacketed polymerization reactor wherein the cooling medium is circulated through the jacket throughout the polymerization reaction. This cooling is necessary since most all of the polymerization reactions are exothermic in nature. It is understood of course, that a heating medium may be circulated through the jacket, if necessary for the desired control of temperature.

In the suspension process demineralized (D.M.) water, suspending agents and the flexibilizing agent are charged to a polymerization reactor equipped with agitation means. The reactor is then closed and evacuated. Vinyl chloride monomer containing about 1 phm by weight of epoxidized oil as a stabilizing agent is added and the ingredients are agitated at 60° C. until the flexibilizer is dissolved in the vinyl chloride (about 1 hr.), after which the polymerization initiator is added. Suitable epoxidized oils include, for example, epoxidized soybean oil (ESO) and epoxidized linseed oil (ELO). The epoxidized oils may be premixed with the vinyl chloride monomer before charging to the reactor as described above or may be added apart from the vinyl chloride monomer as a separate charge. The polymerization reaction is run under agitation at temperatures from 40° C. to 70° C. and more preferably from 50° C. to 65° C., for about 420 minutes after which a short stopping agent may be added to terminate the reaction. The use of short stopping agents is well-known in the art and need not be discussed here. Additional D.M. water may be charged into the reactor during the course of the reaction as needed. The resin is recovered, stripped of any residual monomer and dried.

The graft copolymer resins thusly produced contain about 5 to 35 parts of CPE per hundred parts of PVC by weight and preferably 20 to 30 parts of CPE based on 100 parts by weight of PVC. The amount of epoxidized oil will generally range from about 1 to about 3 parts by weight based on 100 parts by weight of PVC.

To prevent massing of the CPE resin, the CPE may be dusted with an antiblocking agent. Surprisingly, it has been discovered that dusting the CPE with controlled amounts of an appropriate antiblocking agent before charging the CPE into the reactor, significantly improves the particle morphology of the PVC/CPE resin obtained. Suitable antiblocking agents are talcs and amorphous silicas. The preferred antiblocking agents are the amorphous silicas with the hydrophobically treated amorphous silicas being the most preferred. CAB-O-SIL® TS-720 fumed silica which is manufactured and sold by Cabot Corporation has been found to work extremely well. Typical physical properties of CAB-O-SIL TS-720 are reported by Cabot to be as follows:

| | | |
|---|---|---|
| Surface Area* | ($M^2/g$) | 100 |
| Carbon Content | (Wt. %) | 4.5 |
| Moisture Content** | (WT. %) | 0.5 |

-continued

| | | |
|---|---|---|
| Ignition Loss*** | (Wt. %) | 7.0 |
| Specific Gravity | | 1.8 |
| Bulk Density (lbs/cu ft) | | 2-3 |

*B.E.T. $N_2$ absorption @ 77° K.
**2 hrs @ 105° C.
***2 hrs @ 1000° C.

As previously indicated, the hydrophobic fumed silica may be dusted onto the CPE resin prior to charging the resin into the reactor. It has been found that up to 0.5 weight percent and preferably 0.2 to 0.3 weight percent of the CAB-O-SIL TS-720 antiblocking agent results in uniform, homogeneous spherical resins. The antiblocking agent is dusted onto the CPE resin by methods well-known to the art.

Additional CPE may be mechanically blended with the flexibilized base polymer resin obtained from the homogeneous polymerization process. In this way, the flexibility of the composition may be adjusted to desired levels. Suitable for this purpose are the TYRIN® CPE's previously set forth, although solution polymerized CPE of appropriate particle size (e.g. a particle size is readily dispersible in vinyl chloride will work as well). The additional CPE may be mechanically blended with the flexibilized base resin using conventional powder mixing or fusion blending equipment as previously set forth.

FIRE RETARDANTS/SMOKE SUPPRESSANTS

The composition of the present invention, in addition to the flexibilized base polymer, must also contain flame retardants and smoke suppressants. As suitable flame retardants/smoke suppressants, one or more of the following compounds may be utilized (amounts are given in parts/hundred of the base polymer resin):

| Compound | Range (phr) | Preferred Range (phr) |
|---|---|---|
| Antimony Oxide | 2-20 | 5-10 |
| Copper Oxalate | 0.25-10 | 0.5-3 |
| Amine Molybdates | 2-20 | 3-10 |
| Molybdic Oxide | 2-20 | 5-10 |
| [1]MgO/ZnO | 0.5-20 | 1-7 |
| *Zinc Borate | 0.5-5 | 1-2 |
| Aluminum Trihydrate | 5-150 | 5-80 |

[1]solid solution of ZnO in MgO (55% by wt. MgO: 45% by wt. ZnO) sold by Anzon Inc. under the trademark ONGARD ® II.
*May also be utilized as a flame/smoke suppressant filler.

It should be noted that compounds listed above as flame retardants may also function as smoke suppressants. It should be further noted that flame and smoke suppressant fillers may also be incorporated for additional reduction of smoke obscuration and flame so long as the appropriate particle size (e.g. below 5 microns) is utilized. Therefore, the fillers as used herein are contemplated to serve a dual function as flame and smoke retardants and as fillers.

STABILIZERS

Another required component of the improved flame retardant and smoke suppressant compositions of the present invention are stabilizers. Suitable stabilizing agents include, for example, lead salts such as tribasic lead sulfate, dibasic lead stearate, dibasic lead phosphite and dibasic lead phthalate or mixtures thereof. It should be noted that the lead stabilizers may be coated with a lubricant for easier processing, such stabilizers are commercially available under the trademarks, DYPHOS XL ®, TRIBASE XL ®, TRIBASE EXL ® and TRIBASE EXL ® Special from Anzon Inc. The amounts of lead based stabilizer that are utilized in this invention will range between 2 and 15 phr by weight of base polymer resin and more preferably between 5 and 10 phr by weight of base polymer resin. The lead based stabilizers are preferred for performance and economy, however, stabilizing amounts of mixed metal salts, such as, for example, barium-cadmium, barium-cadmium-zinc, calcium-magnesium-tin-zinc, barium-zinc, and calcium-zinc may also be utilized as stabilizers herein. Other useful metal salt combinations, are for example, strontium-zinc, magnesium-zinc, potassium-zinc, potassium-cadmium-zinc and potassium-barium-cadmium. Antimony based compounds such as alkyl mercaptides and mercaptoacid esters of antimony may also be utilized as stabilizers.

Optionally, a suitable antioxidant may be incorporated into the compositions of the present invention to further improve the retention of physical properties after exposure to heat in the presence of atmospheric oxygen. Representative antioxidants are, for example, 3-methyl-6-t-butylphenol/crotonaldehyde which is available under the TOPANOL ® CA trademark from ICI Americas Inc., methylene (3,5-di-t-butyl-4-hydroxyhydrocinnamate) methane sold under the IRGANOX ® 1010 trademark by Ciba Geigy Corporation and dipentaerythritol.

Plasticizers

To improve the processability and reduce melt viscosities to desired levels, selected plasticizers are a required component of the instant compositions. It has been discovered that certain plasticizers may be utilized without adversely affecting the low flammability characteristics of the polymer compositions. The flame retardant plasticizers that may be utilized in the present invention include, for example, brominated aromatic phthalates such as, for example, PYRONIL ® 45 available from Pennwalt and Great Lakes FR-45B (tetrabromophthalic acid bis (2-ethylhexylester); phosphate plasticizers such as, for example, triaryl phosphates sold under the trademarks SANTICIZER ® 154 from Monsanto, KRONITEX ® 100 from FMC and PHOSFLEX ® 41P from Stauffer, and diaryl phosphates such as SANTICIZER 148 (isodecyldiphenyl phosphate) from Monsanto. Limited amounts of non-flame retardant plasticizers may also be utilized in the present composition including, for example, phthalate esters such as DOP, DIDP, DTDP, DUP, mixed 7, 9, 11 phthalate, and mixed 6, 8, 10 phthalate; polyester plasticizers such as, for example, DRAPEX ® 409 and 429 from Witco Chemical, PLASTOLEIN ® 9789 from Emery Industries; Pentaerythritol ester derivatives such as HERCOFLEX ® 707 (Hercules Inc.); and trimellitate plasticizers such as trioctyl trimellitate or triisononyl trimellitate. The type and amount of plasticizer utilized will depend upon the desired physical characteristics of the composition. Plasticizer loading ranges are set forth below.

| Plasticizer | Range (phr) |
|---|---|
| Brominated aromatic phthalates | 1-80 |
| Triaryl and diaryl phosphates | 1-30 |
| Phthalate esters | 1-10 |
| Polyesters | 1-10 |

-continued

| Plasticizer | Range (phr) |
|---|---|
| Pentaerythritol esters | 1-10 |

As noted above, the compositions of this invention may, if desired, be prepared so as to contain effective amounts of optional ingredients. Thus, fillers, lubricants, processing aids, and pigments may be included in the present compositions. Representative lubricants are, for example, stearic acid, oxidized polyethylene, paraffin waxes, glycerol monostearate and partial fatty acid esters. Lubricants provide lubrication of the composition in the manufacturing process. This ensures that all of the constituents blend together without sticking to metal processing equipment to obtain a homogeneous mix with an accompanying reduction of internal friction during processing.

In order to minimize or eliminate plate-out or slipping of the composition on the extruder screw or sleeving on mill rolls during processing, processing aids may be advantageously incorporated. Suitable processing aids include, for example, polyurethanes such as ESTANE® 5701 and 5703 polyester based resins sold by The BFGoodrich Company and acrylonitrile/butadiene latex rubbers, such as certain HYCAR® rubbers also available from BFGoodrich. Estane 5701 and 5703 resins are more specifically described in product bulletins 86-0837i-33 and 86-0837i-035, respectively. HYCAR acrylonitrile/butadiene latex rubbers are more fully described in Latex Product Bulletin L-12 (July 1984). These bulletins are available from BFGoodrich Chemical Group, Cleveland, Ohio 44131.

Pigments such as titanium dioxide, carbon black and molybdate orange and the like may be added for asthetic as well as for light and U.V. blocking and screening purposes.

Fillers which may advantageously be incorporated into the compositions of the present invention include calcium carbonate, magnesium oxide, magnesium carbonate, magnesium hydroxide, hydrated aluminum oxide e.g., aluminum trihydrate, ($Al_2O_3.3H_2O$), ceramic microspheres ($SiO_2/Al_2O_3$ alloy 0-300 microns particle size) sold under the trademark ZEEOSPHERES® by Zeelan Industries Inc. and electrical grade calcined koalin clay or mixtures thereof. The fillers, when employed, serve to further enhance the flame and smoke suppressant characteristics of the compositions of this invention. When utilizing fillers for smoke suppressant properties the magnesium containing compounds are preferred, with magnesium oxide and magnesium carbonate being most preferred. The preferred levels of magnesium oxide and carbonate will range from about 3 to 50 phr by weight with about 10 to 25 phr being most desirable. Referring to the calcium carbonate fillers, it has been found that average particle sizes above about 3.5 microns adversely affects the low temperature brittleness properties of the compositions. Moreover, it has been discovered that an average particle size of about 0.07 microns imparts superior smoke suppressant as well as acid gas suppressant characteristics to the compositions of this invention.

In utilizing the fillers of the present invention it should be noted that maximum filler loadings for wire insulation compositions should be no more than 75 phr by weight based upon 100 parts by weight of base polymer resin and filler loadings for jacketing compositions should be no more than 150 phr by weight based upon 100 parts by weight of base polymer.

The levels of ingredients disclosed herein which may optionally be incorporated into the compositions of this invention, unless otherwise stated, are not critical provided that such amounts provide the desired effect and do not adversely affect the overall characteristics and properties of the composition.

Any method which provides uniform mixing of the ingredients may be used to prepare the compositions of this invention. A preferred procedure involves the steps of dry blending all of the ingredients to homogeneity followed by fluxing the dry blend at elevated temperatures and then extruding the melt blend, cooling and then dicing into cubed or pelletized form.

In admixing the ingredients, the flexibilized base polymer (whether obtained by mechanical blending or homogeneous polymerization) is first admixed in an intensive powder blender with the stabilizer(s). Next, any metallic oxide fire and smoke suppressant and/or filler components and other non-metallic oxide filler materials are dispersed to homogeneity in the admixture. The plasticizers, if utilized, are then admixed in. If liquid plasticizers are utilized, it is important that the composition be blended until the dry point is reached, e.g., until the liquid is totally absorbed into the resin composition and a dry powder composition is again obtained. The antioxidants, if called for, should preferably be admixed in the liquid plasticizer. If the liquid plasticizer is not present in the recipe the antioxidants may be directly admixed into the dry powder composition. The desired lubricants may be mixed in at this point. It should be noted that if a clay filler is to be incorporated into the composition, it should be the last ingredient admixed. If added too early in the admixing process, the abrasive clay particles may abrase iron from the mixer apparatus which could adversely react with the other components of the composition to produce undesirable discoloration.

The homogeneously admixed dry powder blend is then melt compounded on a fluxing mixer such as a Banbury mixer or equivalent or a continuous fluxing type mixer such as, for example, a Farrel Continuous Mixer (FCM), Buss Ko Kneader or planetary gear extruder at a temperature above the melting point of the composition but below the decomposition temperature of any of the ingredients. The composition is then extruded, cooled and then preferably diced into cubes or pellets. Subsequently, the pellets may then be utilized in a conventional extruder fitted with conductor insulation or jacketing die means to provide an insulated electrical conductor or jacketed cable. Methods of fabricating insulated wire and cable are well known in the art. Such methods are disclosed, for example, in U.S. Pat. No. 4,605,818 which is herein incorporated by reference.

The wire and cable insulation and jacketing derived from the compositions of this invention exhibit fire and smoke suppression characteristics far superior to those heretofore attainable, in the prior art, while at the same time achieving the physical properties necessary for use under commercial service conditions.

The particular combination of ingredients and additives in commercially useful compositions within the scope of this invention will depend upon the desired properties and specific end use requirements and is varied from one application to another to achieve the optimum composition.

The following examples will further illustrate the embodiments of this invention. While these examples will show one skilled in the art how to operate within the scope of this invention, they are not intended to serve as a limitation on the scope of this invention for such scope is defined only in the claims.

TESTING PROCEDURES

The following is a list of the tests and testing procedures utilized to evaluate and characterize the compositions of the present invention.

Limiting Oxygen Index (LOI) — The oxygen index is defined as the volume of percent oxygen required to support combustion. The greater the LOI, the better are the flame retardant properties of the composition. LOI was measured by means of Stanton-Redcraft equipment designed to meet ASTM D2863-87.

Heat and Smoke Release (RHR) and (RSR) was measured by means of the Ohio State University (OSU) rate of heat release calorimeter designed to meet ASTM E906-83 test requirements. Sample sizes were $152.4\times152.4\times6.4$ mm in a verticle orientation and with incident fluxes of 20, 40 and 70 kW/m$^2$. The results reported are: the total heat released prior to 5, 10 and 15 min. (THR @ × min, in MJ/m$^2$), the maxmium rate of heat release (Max RHR, in kW/m$^2$), the total smoke released prior to 5, 10 and 15 min. (obscuration, TSR @ × min, in SMK/m$^2$), the maximum rate of smoke release (obscuration, Max RSR, in SMK/min-m$^2$).

Specific Smoke Density in both the flaming ($D_m$/g (F)) and non-flaming ($D_m$/g (NF)) modes was measured by means of the National Bureau of Standards (NBS) smoke chamber designed to meet ASTM E662-83 test requirements. The maximum optical density (as a function of light obscuration)/gram of sample observed with a vertical light path was measured.

Wedge Shear Strength (Wedge Shear) is the force (load) required for the equivalent of a wedge 1 in. in length to cut through a wire insulation specimen and may be calculated as follows:

$$\text{Wedge Shear} = \frac{\text{Breaking Load (lbs.)}}{\text{Wedge Length (in.)}}$$

The test specimens are cut from molded sheets (2 in. × ½in. minimum dimensions by 75 mils thick) and placed between the parallel jaws of a compression testing apparatus (Instron model TTC) equipped with a recording indicator that furnishes a plot of specimen deformation versus load. The jaws of the apparatus consist of an upper wedge shaped jaw and a lower flat jaw. The test specimen is placed lengthwise along the lower jaw so that the apex of the wedge on the upper jaw is parallel with the longitudinal central axis of the specimen. The breaking load is the point at which the applied load produces an abrupt reduction in jaw separation without a proportionate increase in load.

Dynamic Thermal Stability (DTS) to determine the stability of the compositions when subjected to processing conditions was measured as follows.

A test specimen is loaded into a Brabender Plasti-Corder (Type PL-V150) high shear mixer which is equipped with a torque recorder. The specimen is then subjected to predetermined shear and temperature conditions which approximate or exceed normal commercial processing conditions. During the run small test samples are removed at 2 min. time intervals and the torque curve is observed along with visible changes in sample conditions for the run. The run is continued until a definite change in torque and visible degradation of test sample are observed. If the torque curve does not rise within 30 min., DTS is recorded as >30 min. unless a greater DTS is needed.

If the torque rises before 30 minutes is reached, a vertical line is drawn through a point where a 30° angle (relative to the base line of the torque chart) tangentially touches the initial falling torque curve and another vertical line is drawn through a point where a 30° angle (relative to the base line of the torque chart) tangentially touches the rising torque curve at the end of the run. The points where the 30° lines tangentially touch the falling and rising torque curves are considered the start and finish of the Dynamic Thermal Stability run. The distance between the vertical lines drawn through the starting and ending points represents the Dynamic Thermal Stability time.

| | |
|---|---|
| Specific Gravity | ASTM D792-86 |
| Brittleness Temp. (°C.) | ASTM D746-79 (1987) |
| % Heat Distortion | ASTM D2633-82 |
| Tensile Strength (psi) | ASTM D638-87b |
| 100% modulus (psi) | |
| % elongation | |
| Oven Aging* | ASTM D573-88 |
| Aged Tensile Strength | (Specimen prep. - ASTM D412) |
| Aged 100% modulus | |
| Aged yield point | |
| Aged % elongation | |
| *7 days @ 121° C. | (UL 1581 Table 50.145) |
| Melt Flow | ASTM D3364-74 (1983) |
| | (Short orifice - ASTM D1238-85) |
| Volume Resistivity | ASTM D257-78 (1983) |
| Dielectric Strength | ASTM D149-81 |

Hydrogen Halide Acid Gas Coil Test (Coil) test) is a test for determining the amount of acid gas released from the thermal decomposition of a material. This procedure involves the thermal decomposition of a sample of a material by the action of a coil of electrically heated resistance wire. The released acid gas (HCl) is absorbed into aqueous solution and measured using a chloride ion selective electrode.

EXAMPLES 1-7

These examples illustrate the preparation of flexibilized base polymers via the homogeneous polymerization process.

In accordance with the polymerization recipes set forth in Table I demineralized (D.M.) water, methylcellulose suspending agent, various hydrolyzed polyvinyl acetate dispersants, were charged to a reactor equipped with an agitator. To this was added the flexibilizer component(s) set forth in Table I. The reactor was then thorouqhly purged of oxygen and evacuated. Vinyl chloride monomer (VCl) and epoxidized soybean oil (ESO) stabilizer were then added in accordance with the recipes set forth in Table I. The ESO was pre-mixed with the VCl prior to charging into the reactor. The contents of the reactor were agitated at 65° C for approximately 1 hour to allow the flexibilizer to thoroughly disperse in the VCl monomer. The temperature was adjusted as desired and polymerization initiator was added to start the reaction. The reaction was allowed to proceed for 420 min.

The resin products were then recovered, stripped of residual monomer, washed and dried.

TABLE I

| Ingredients (Phm) | Examples 1 | 2 | 3 | 4 | 5 | 6 | 7 |
|---|---|---|---|---|---|---|---|
| D.M. $H_2O$ | 188 | 188 | 160 | 175 | 175 | 195 | 195 |
| VCl | 79 | 79 | 79 | 79 | 79 | 89 | 89 |
| CPE(1) | 20 | 20 | 20 | — | — | 10 | 10 |
| EVA | — | — | — | 20 | 20 | — | — |
| ESO | 1 | 1 | 1 | 1 | 1 | 1 | 1 |
| Suspending Agent(2) | 0.14 | 0.14 | 0.10 | 0.06 | 0.06 | 0.10 | 0.10 |
| Dispersant(3) | 0.07 | 0.07 | 0.04 | 0.05 | 0.05 | 0.04 | 0.04 |
| Dispersant(4) | 0.14 | 0.14 | 0.12 | 0.12 | 0.12 | 0.10 | 0.10 |
| Initiator | 0.03 | 0.03 | 0.03 | 0.03 | 0.03 | 0.03 | 0.03 |
| Polymerization Temp. (°C.) | 57 | 65 | 53 | 61 | 53 | 53 | 53 |
| Base Polymer Composition (phr) PVC/Flexibilizer/ESO | 100/31.9/1.6 | 100/31.0/1.6 | 100/29.3/1.5 | 100/25.8/1.3 | 100/30.7/1.6 | 100/21.1/2.1 | 100/14.5/1.7 |

(1)CPE was dusted with 0.2 to 0.3 weight % of CAB-O-SIL ® TS-720 amorphous silica
(2)methyl cellulose
(3)polyvinyl acetate 54% hydrolyzed
(4)polyvinyl acetate 70–72% hydrolyzed

EXAMPLES 8–10

To a Henschel mixer pre-heated to 38° C. were added the flexibilized base polymer, stabilizers, fire and smoke suppressants, and processing aid as set forth in Table II. The ingredients were mixed at 3600 rpm @ 60° to 70° C. until a homogeneous blend was obtained. Liquid plasticizer was slowly added and mixed until the dry point was reached. Lubricants were then added and the ingredients were mixed until the temperature of the composition reached 85° to 91° C. The admixture was transferred to a Banbury mixer (No. 50 Farrel) and mixed with the appropriate amount of CPE at 60 rpm. The admixture was then thoroughly fluxed until its temperature reached 165° to 177° C. The composition was then milled into sheets and compression molded into plaques from which specimens were die cut for subsequent testing. The test results are set forth in Table III.

TABLE II

| Ingredients | Examples Amounts (phr) 8 | 9 | 10 |
|---|---|---|---|
| 1Flexibilized base polymer | 116.2 | 123.3 | 123.3 |
| 2CPE (TYRIN ® CM0136) | 50.5 | 37.7 | — |
| 3CPE | — | — | 37.7 |
| 4Polyurethane (Estane ® 5703) | 4.0 | 2.1 | 2.1 |
| 5Tetrabromophthalic acid bis (2-ethylhexyl ester) | 10.0 | 10.6 | 10.6 |
| Tribasic Pb sulfate | 8.0 | 8.5 | 8.5 |
| Dibasic Pb stearate | 0.5 | 0.53 | 0.53 |
| 6MgO/ZnO (solid solution of Zn Oxide in Mg Oxide) | 1.0 | 1.06 | 1.06 |
| $Al_2O_3 \cdot 3H_2O$ | 10.0 | — | — |
| Melamine Molybdate | 3.0 | 3.18 | 3.18 |
| Copper Oxalate | — | 0.53 | — |
| $TiO_2$ | 1.0 | 1.06 | 1.06 |
| Oxidized Polyethylene | 0.25 | 0.27 | 0.27 |
| Steric Acid | 0.5 | 0.53 | 0.53 |
| $Sb_2O_3$ | 7.0 | 7.4 | 7.4 |

1Prepared according to examples 7, 6, 6, respectively.
2Trademark of Dow Chemical (36% Cl content, Sp. Gr. 1.16, Melt viscosity (poises/1000) 21.6).
3DuPont CPE prepared by solution chlorination 36% Cl content, 110 ML (1 + 4) Mooney viscosity @ 100° C.
4Trademark of B F Goodrich.
5Great Lakes Chemical DP-45.
6Anzon, Inc. ONGARD ® II.

TABLE III

| Physical Property | Examples 8 | 9 | 10 |
|---|---|---|---|
| Specific Gravity | 1.43 | 1.41 | 1.40 |
| Oxygen Index | 47.0 | 45.8 | 46.6 |

TABLE III-continued

| Physical Property | Examples 8 | 9 | 10 |
|---|---|---|---|
| NBS Smoke (Dm/g) | | | |
| Flaming | 35.8 | 38.6 | 30.0 |
| Non-flaming | 27.8 | 27.4 | 28.1 |
| Brittleness Temp. (°C.) | −42.5 | −45 | −41.5 |
| Wedge Shear (lb/in) | 913 | 811 | 1061 |
| % Heat Distortion (1 Hr. @ 121° C. under 2000 g) | 56.9 | 40.4 | 35.5 |
| *Tensile Strength (psi) | 1965 | 2080 | 2275 |
| 100% Modulus (psi) | 1765 | 1960 | 2225 |
| % Elongation | 113 | 134 | 139 |
| +Aged Tensile Strength (psi) | 2107 | 3210 | 2373 |
| +Aged 100% Modulus/Yield pt. (psi) | 2018 | 3138 | 2372 |
| +Aged % Elongation | 117 | 105 | 137 |
| % Retention Tensile Strength | 107 | 154 | 104 |
| % Retention Modulus/yield pt. | 114 | 160 | 107 |
| % Retention Elongation | 103.5 | 78 | 99 |
| Volume Resistivity (Dry ohm/cm) | $3 \times 10^{14}$ | $2.8 \times 10^{14}$ | $7.3 \times 10^{14}$ |
| DTS (mon @ 50 rpm, 385° F.) | 5.75 | 11.0 | 9.0 |
| Melt Flow (Short Orifice 175° C., mg/min) | 212 | 416 | 327 |
| Dielectric Constant @ 10 kHz | 3.7 | 4.05 | 3.9 |

*35 mil dumbells
+ 7 days oven aging @ 121° C.

EXAMPLES 11–17

Flame and smoke retardant compositions were prepared via mechanical mixing. The powder mixing, fluxing and extruding steps were conducted as set forth in examples 8–10. The ingredients and test results are set forth below in Tables IV and V, respectively. These compounds were further evaluated by comparison to three commercially available flame and smoke retardant compositions (Examples 15, 16 and 17 in Table V).

Figure 2:
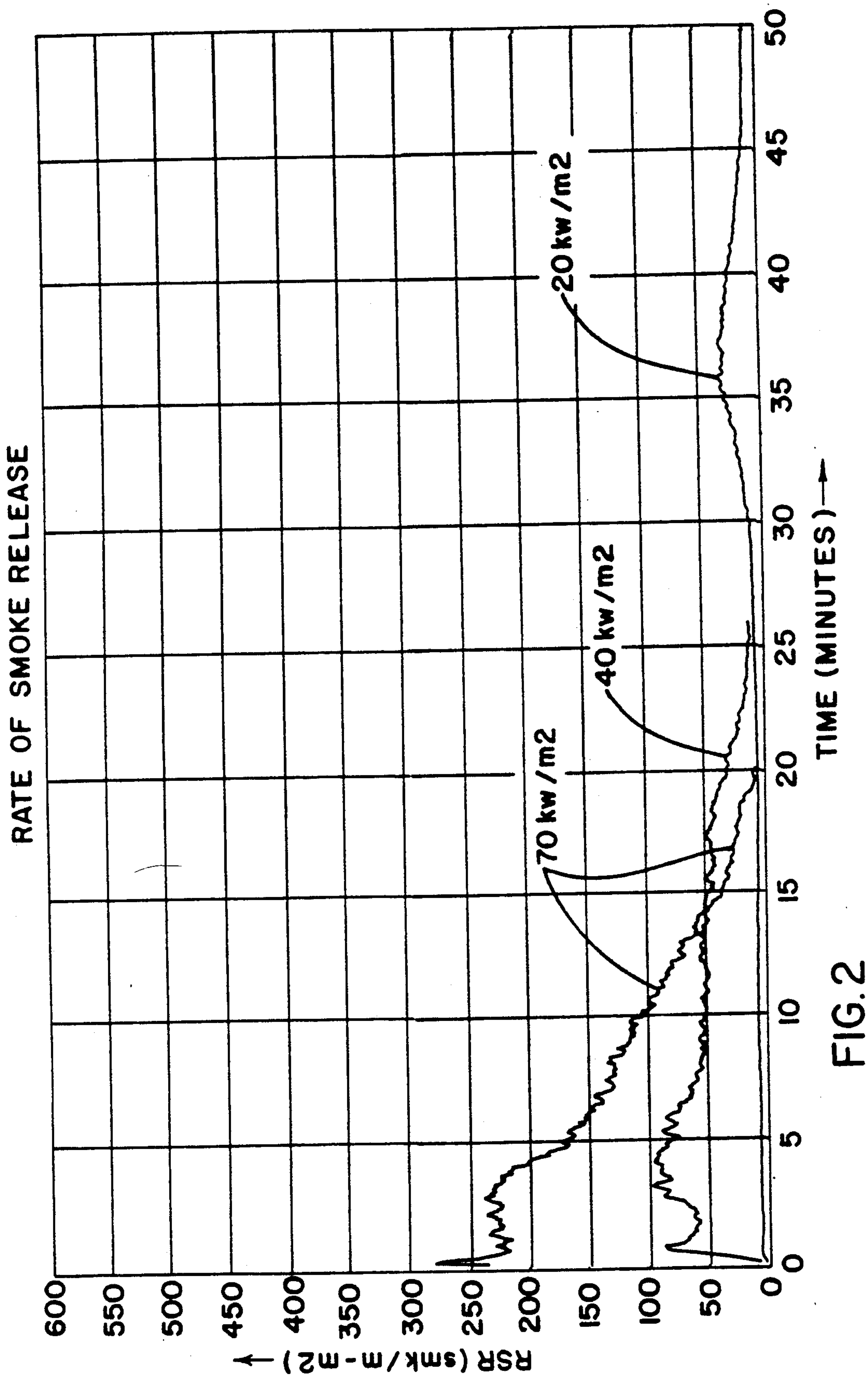
FIG. 2 illustrates the rate of smoke release (RSR) at heat fluxes of 20, 40 and 70 kW/m$^2$ for the composition of Example 13.
Figure 3:
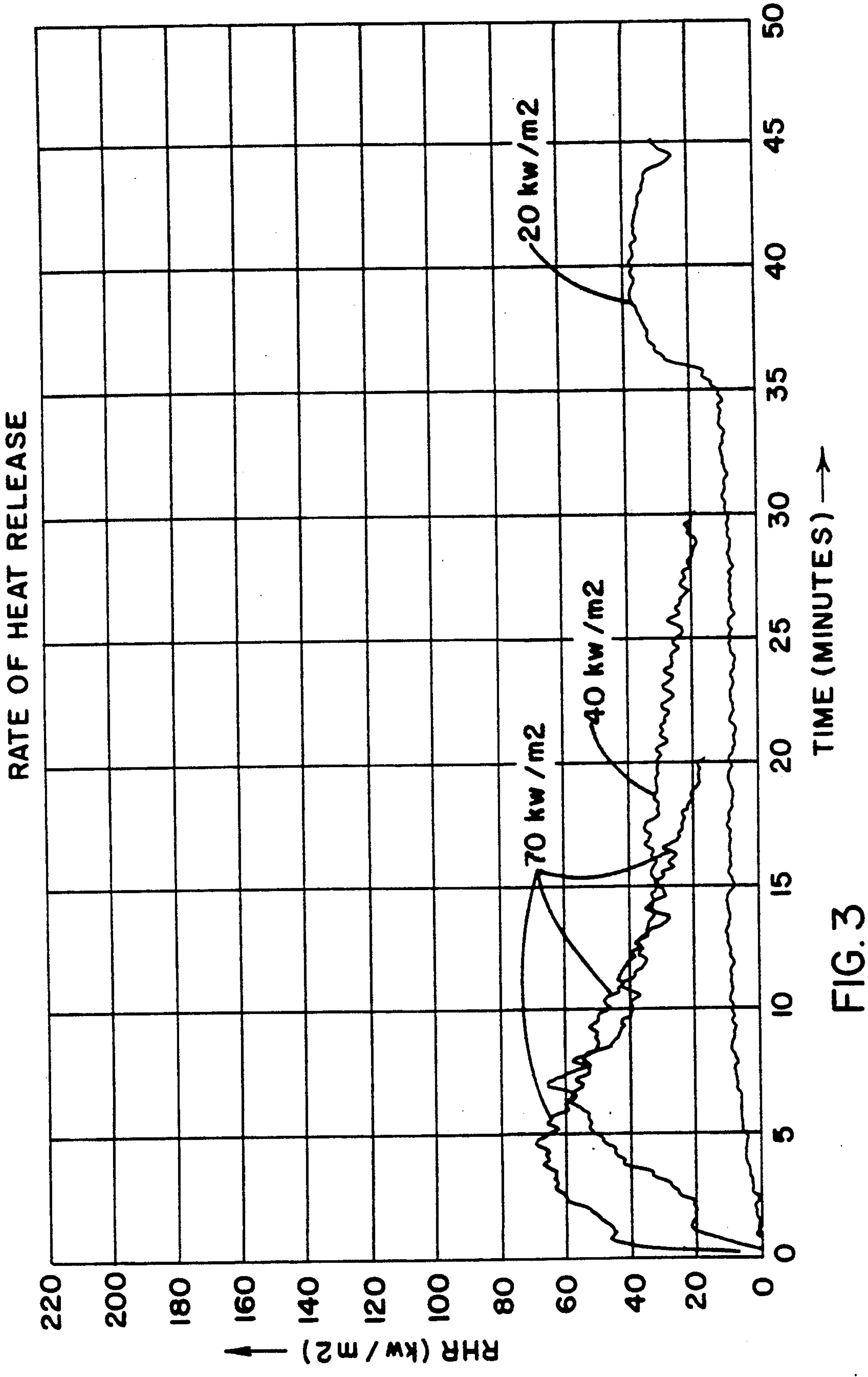
FIG. 3 illustrates the rate of heat release (RHR) at heat fluxes of 20, 40 and 70 kW/m$^2$ for the composition of Example 14.
Figure 4:
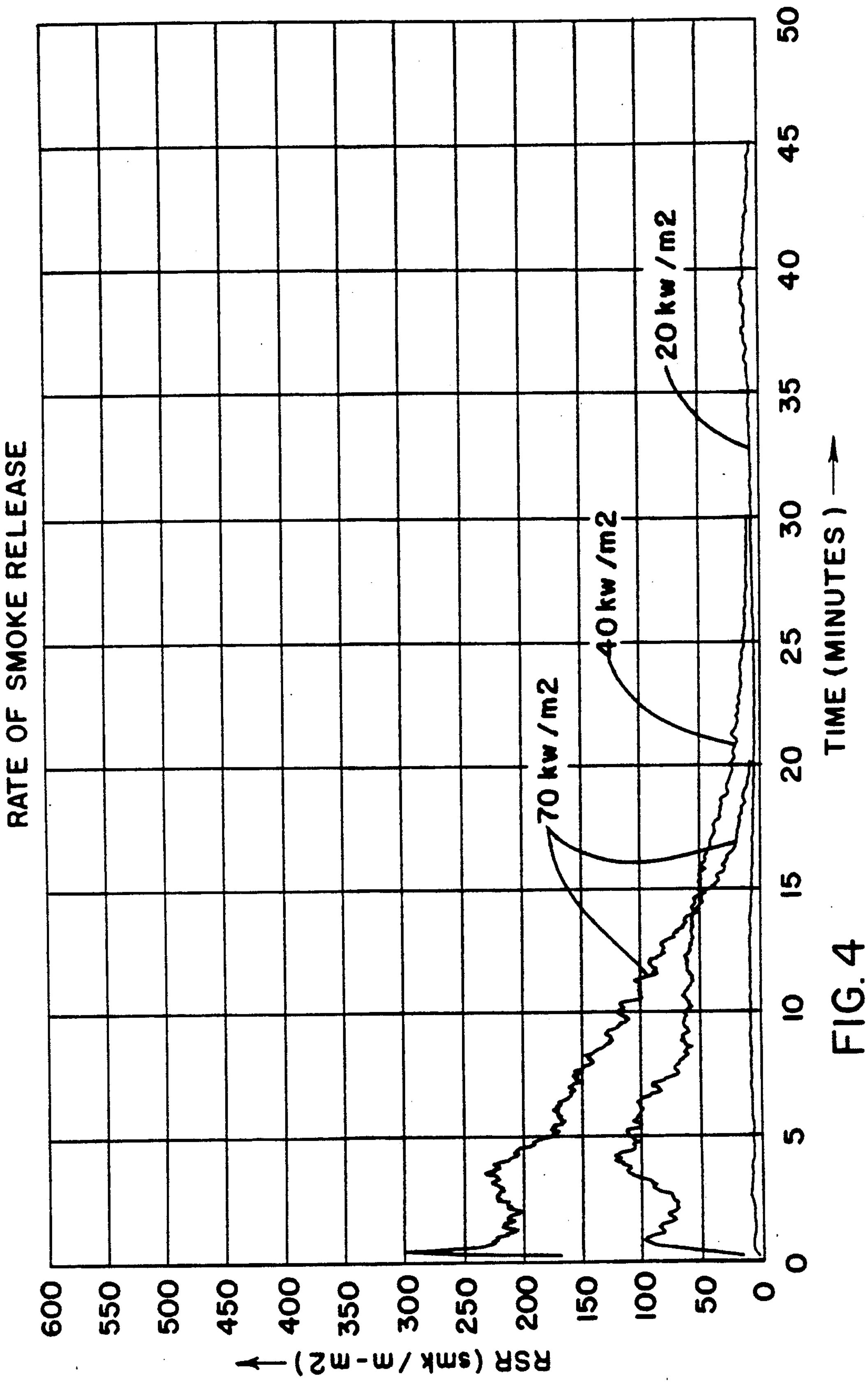
FIG. 4 illustrates the rate of smoke release (RSR) at heat fluxes of 20, 40 and 70 kW/m$^2$ for the composition of Example 14.
Figure 5:
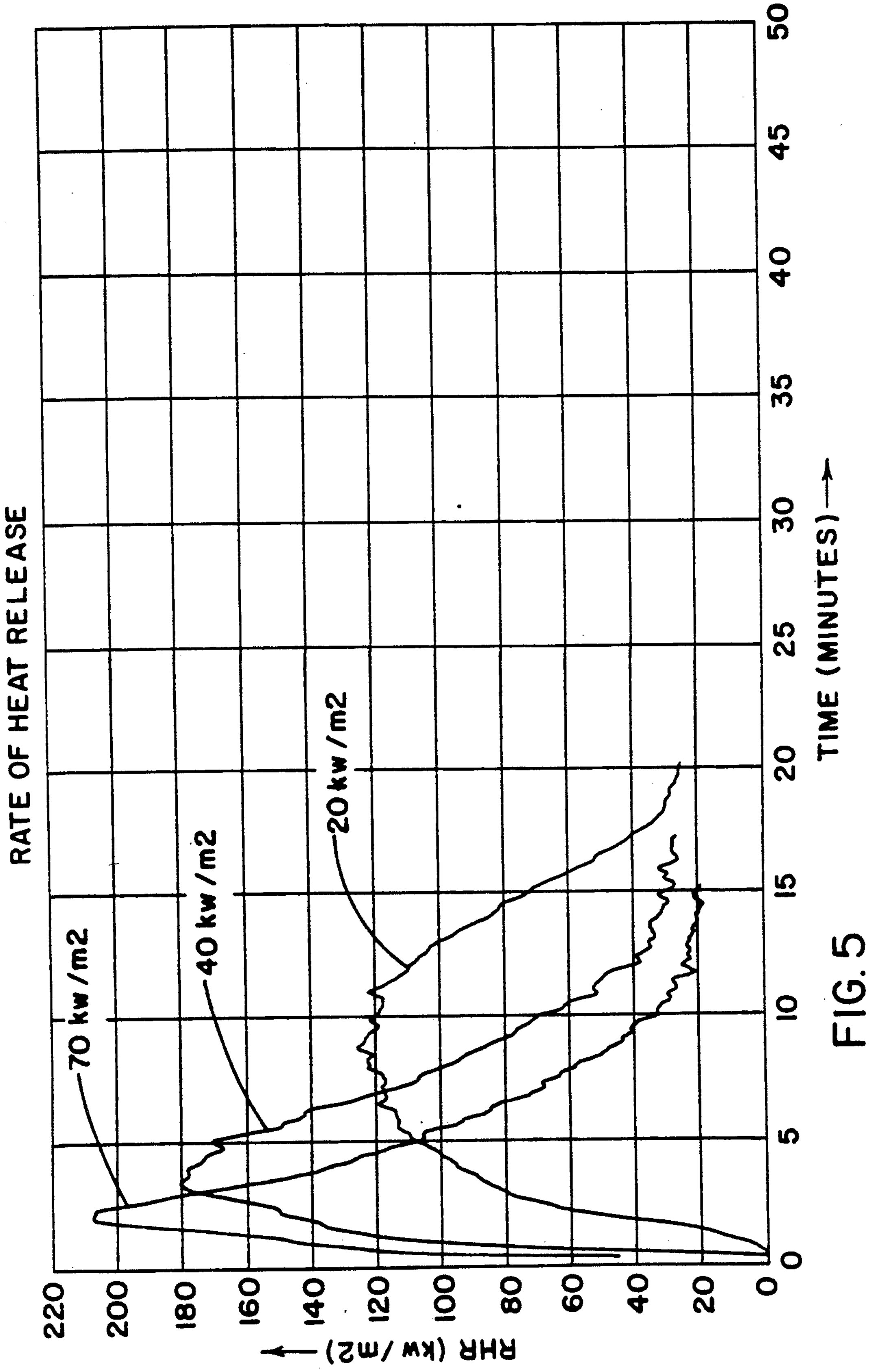
FIG. 5 illustrates the rate of heat release (RHR) at heat fluxes of 20, 40 and 70 kW/m$^2$ for a conventional PVC wire and cable compound (comparative Example 16).
Figure 6:
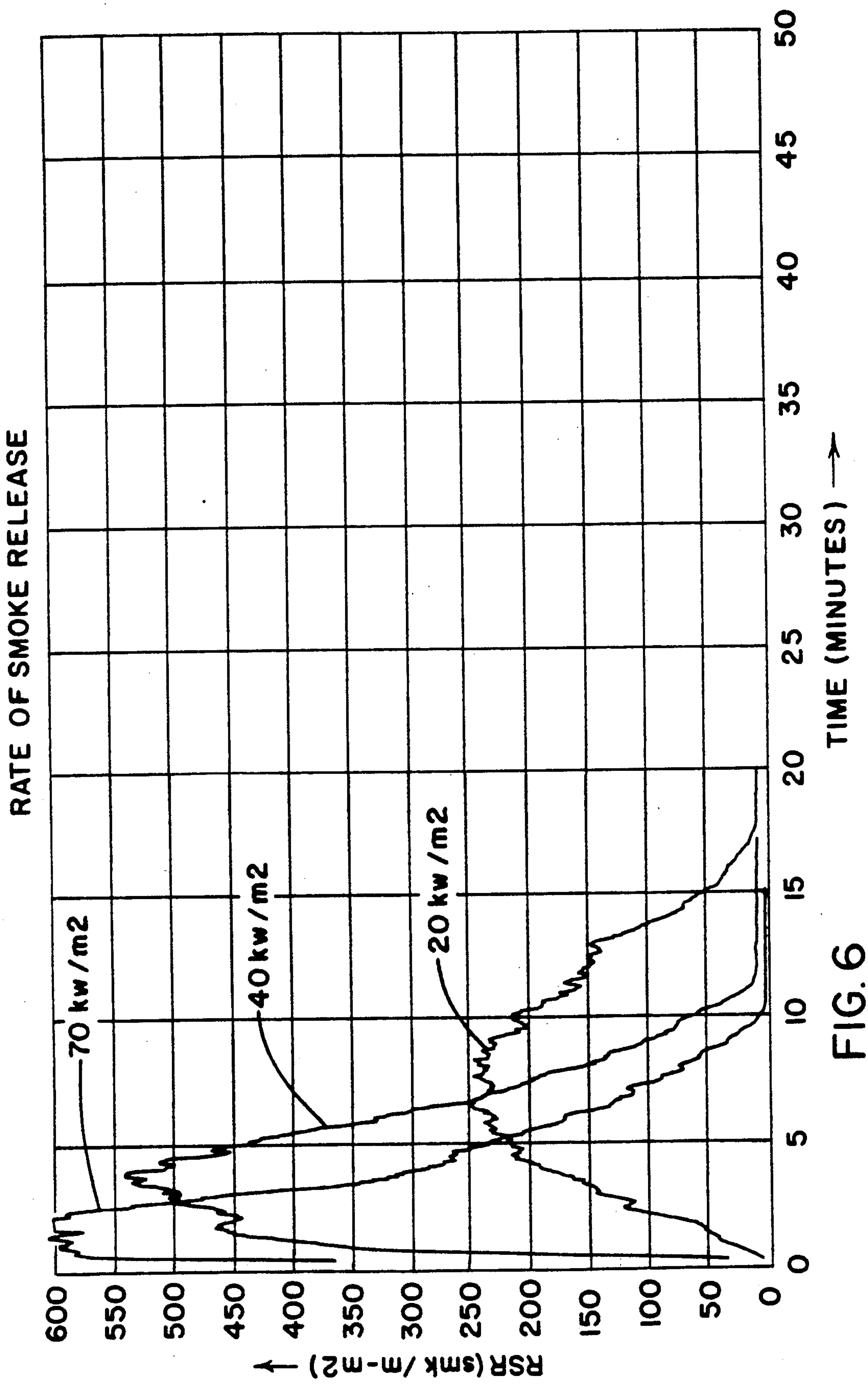
FIG. 6 illustrates the rate of smoke release (RSR) at heat fluxes of 20, 40 and 70 kW/m$^2$ for a conventional PVC wire and cable compound (comparative Example 16).
Figure 7:
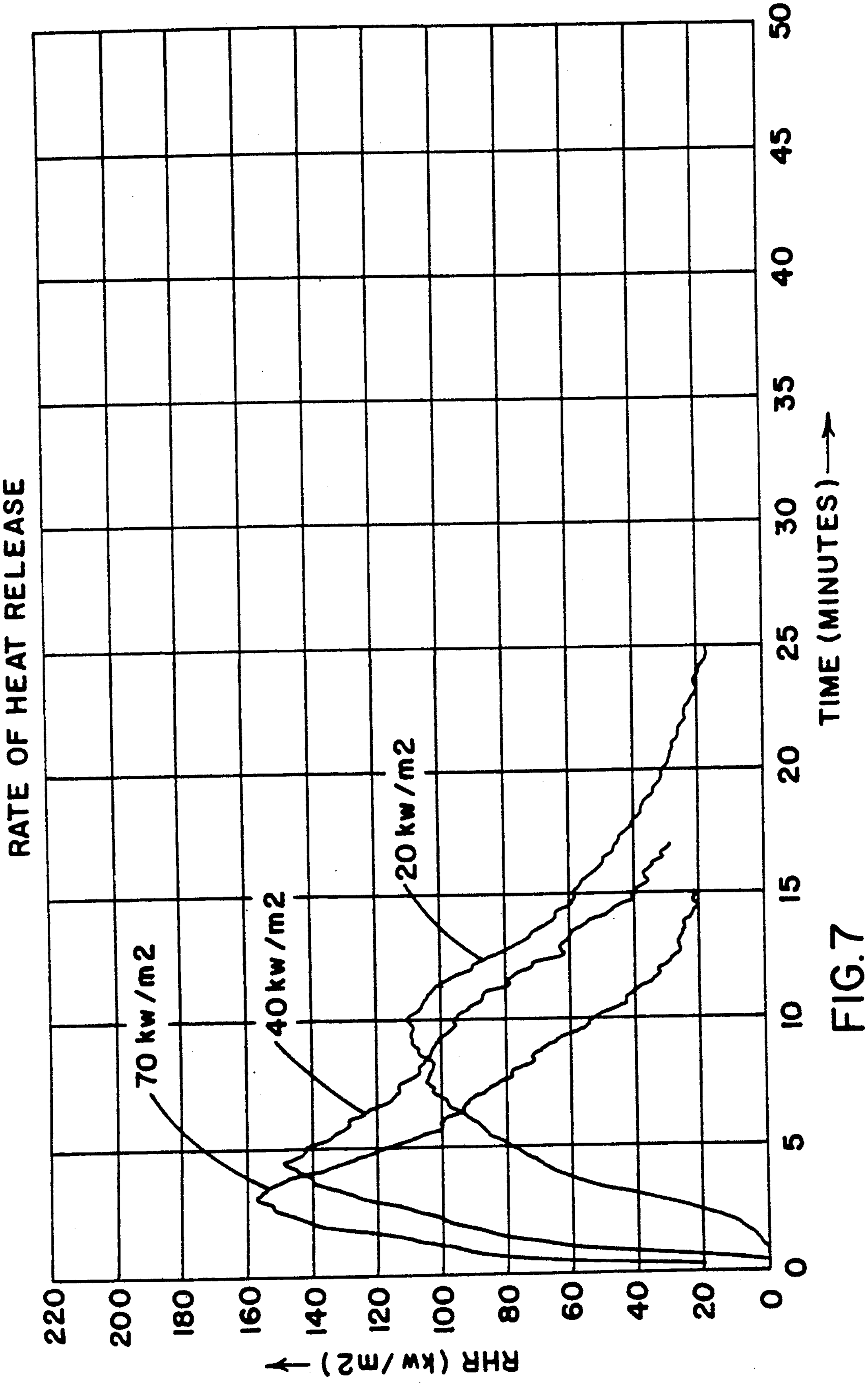
FIG. 7 illustrates the rate of heat release (RHR) at heat fluxes of 20, 40 and 70 kW/m$^2$ for a conventional PVC wire and cable compound (comparative Example 17).
Figure 8:
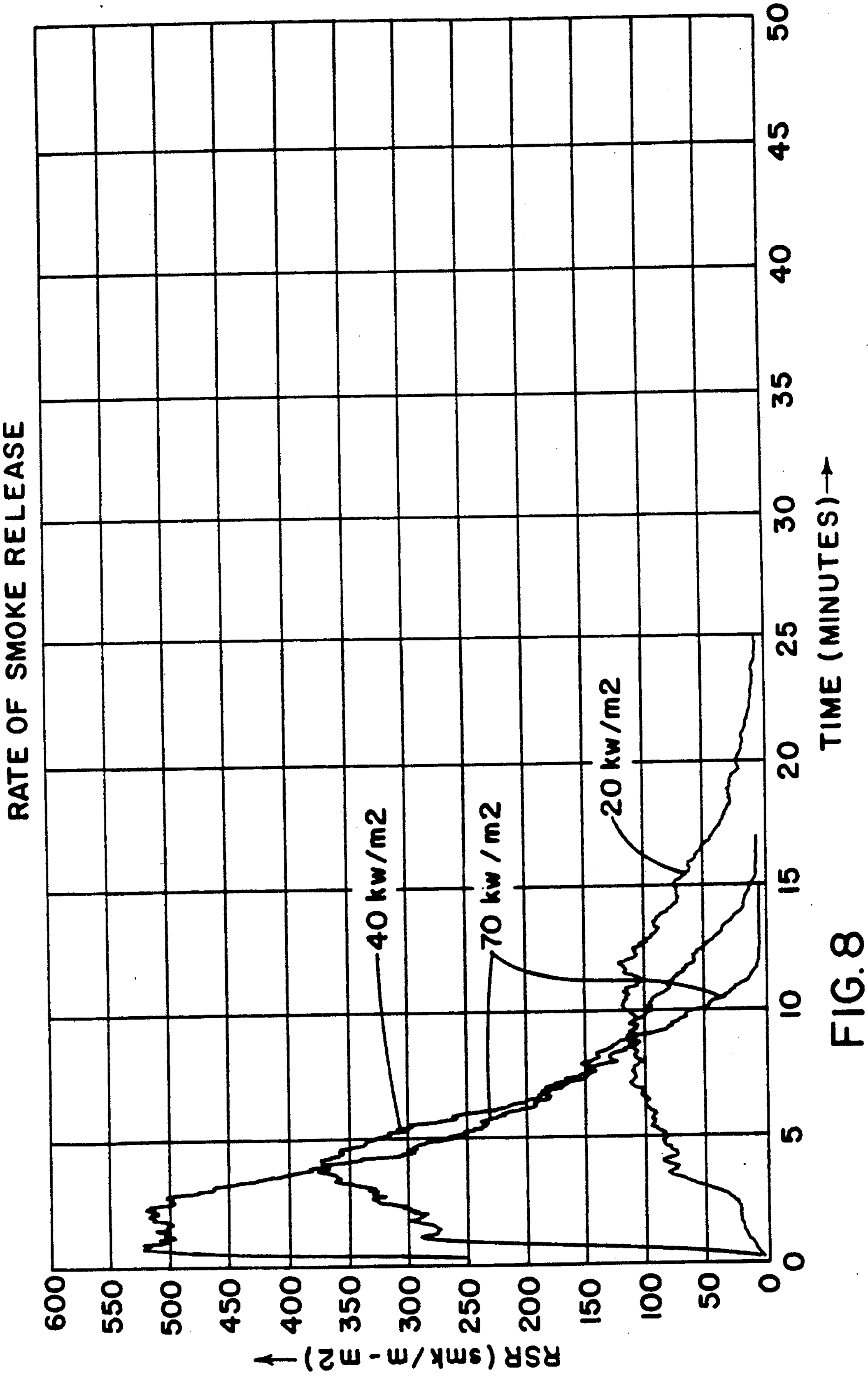
FIG. 8 illustrates the rate of smoke release (RSR) at heat fluxes of 20, 40 and 70 kW/m$^2$ for a conventional PVC wire and cable compound (comparative Example 17).

The OSU calorimeter RHR and RSR data for Examples 13, 14, 16 and 17 are graphically represented in FIGS. 1 through 8. The RHR and RSR values at fluxes of 20, 40 and 70 kW/m² are significantly lower for the compositions of the present invention (Examples 13 and 14) relative to the prior art standards (Examples 16 and 17). These data indicate that the compositions of the present invention are superior in flame retardant and smoke obscuration properties.

TABLE IV

| Ingredients | Examples Amounts (phr) 11 | 12 | 13 | 14 |
|---|---|---|---|---|
| 1PVC (GEON ® 26) | 100 | 100 | 100 | 100 |
| 2CPE | 55 | 45 | 40 | 35 |

TABLE IV-continued

| Ingredients | Examples Amounts (phr) 11 | 12 | 13 | 14 |
|---|---|---|---|---|
| Tetrabromophthalic acid bis (2-ethylhexyl ester) | 10 | 20 | 25 | 35 |
| Tribasic Pb sulfate | 8 | 8 | 8 | 8 |
| Dibasic Pb stearate | 0.5 | 0.5 | 0.5 | 0.5 |
| $Sb_2O_3$ | 6 | 7 | 8 | 9 |
| MgO/ZnO (solid solution of Zn Oxide in Mg Oxide) | 1 | 1 | 1 | 1 |
| $Al_2O_3 \cdot 3H_2O$ | 10 | 10 | 10 | 10 |
| Melamine Molybdate | 2 | 2 | 3 | 3 |
| Copper Oxalate | 1 | 1 | 2 | 2 |
| $TiO_2$ | 1 | 1 | 1 | 1 |
| Oxidized Polyethylene | 0.25 | 0.25 | 0.25 | 0.25 |
| Stearic Acid | 0.5 | 0.5 | 0.5 | 0.5 |

[1]Trademark of B F Goodrich
[2]DuPont CPE prepared by solution chlorination (36% Cl content, 110 ML (1 + 4) Mooney viscosity @ 100° C.

TABLE V

| Physical Property | Examples 11 | 12 | 13 | 14 | 15 | 16 | 17 |
|---|---|---|---|---|---|---|---|
| Specific Gravity | 1.45 | 1.48 | 1.51 | 1.52 | 1.37 | 1.30 | 1.40 |
| Oxygen Index | 51.1 | 50.1 | 49.7 | 47.9 | 21.3 | 26.5 | 28.1 |
| NBS Smoke ($D_m$/g) | | | | | | | |
| Flaming | 40.6 | 37.6 | 41.3 | 33.6 | 51.3 | 61.7 | 49.5 |
| Non-flaming ($D_m$/g) | 24.9 | 29.2 | 25.8 | 28.3 | 44.0 | 52.1 | 45.2 |
| Brittleness Temp. (°C.) | −48.5 | −33.5 | −33 | −31 | −35 | −42.5 | −23 |
| Wedge Shear (lb/in) | 1335 | 1382 | 1385 | 1214 | 506 | 510 | 683 |
| % Heat Distortion (1 Hr. @ 121° C. under 2000 g) | 29.3 | 25.4 | 25.1 | 28.0 | 38.7 | 28.1 | 21.6 |
| *Tensile Strength (psi) | 2598 | 2697 | 2903 | 2767 | 2283 | 2411 | 2417 |
| 100% Modulus (psi) | 2473 | 2667 | — | — | 1128 | 1280 | 1450 |
| Yield Point (psi) | — | — | 3013 | 3031 | — | — | — |
| % Elongation (75 mil dumbells) | 160 | 123 | 143 | 173 | 357 | 353 | 283 |
| +Aged Tensile Strength (psi) | 2808 | 2953 | 3140 | 2875 | 2228 | 2561 | 2588 |
| +Aged 100% Modulus (psi) | 2808 | — | — | — | 1895 | 2415 | 1506 |
| +Aged Yieldpoint (psi) | — | 3013 | 3337 | 3176 | — | — | — |
| +Aged % Elongation | 100 | 97 | 77 | 97 | 247 | 247 | 350 |
| % Retention Tensile Strength | 108 | 109 | 108 | 104 | 98 | 106 | 107 |
| % Retention Modulus/yield pt. | 114 | 113 | 111 | 105 | 168 | 189 | 104 |
| % Retention Elongation | 62.5 | 79 | 54 | 56 | 69 | 70 | 124 |
| Dielectric Strength (volts/mil) | 681 | 713 | 751 | 720 | 906 | 748 | 637 |
| Cumulative Heat Released Prior to 5 min., $MJ/m^2$ in OSU RHR Cal: | | | | | | | |
| Flux 20 $kW/m^2$ | 0 | 0 | 0 | 0 | 26 | 17.5 | 8.7 |
| Flux 40 $kW/m^2$ | 5.8 | 4.9 | 6.3 | 7.3 | 45 | 42 | 30 |
| Flux 70 $kW/m^2$ | 15.5 | 14.9 | 19.1 | 15.1 | 38 | 24 | 36 |
| Cumulative Heat Released Prior to 10 min., $MJ/m^2$ in OSU RHR Cal: | | | | | | | |
| Flux 20 $kW/m^2$ | 0 | 0.2 | 1.1 | 0.2 | 68 | 52 | 38 |
| Flux 40 $kW/m^2$ | 26 | 21 | 19 | 22 | 84 | 72 | 62 |
| Flux 70 $kW/m^2$ | 32 | 32 | 37 | 30 | 62 | 61 | 59 |
| Cumulative Heat Released Prior to 15 min., $MJ/m^2$ in OSU RHR Cal: | | | | | | | |
| Flux 20 $kW/m^2$ | 0 | 1.9 | 3 | 1.6 | 93 | 80 | 61 |
| Flux 40 $kW/m^2$ | 42 | 32 | 28 | 31 | 107 | 60 | 81 |
| Flux 70 $kW/m^2$ | 43 | 43 | 49 | 40 | 76 | 67 | 67 |
| Cumulative Smoke Released Prior to 5 min., $SMK/m^2$ in OSU RHR Cal: | | | | | | | |
| Flux 20 $kW/m^2$ | 21 | 29 | 30 | 23 | 757 | 599 | 215 |
| Flux 40 $kW/m^2$ | 260 | 383 | 367 | 438 | 1611 | 2185 | 1462 |
| Flux 70 $kW/m^2$ | 1422 | 1375 | 1110 | 1066 | 1782 | 2209 | 2137 |
| Cumulative Smoke Released Prior to 10 min., $SMK/m^2$ in OSU RHR Cal: | | | | | | | |
| Flux 20 $kW/m^2$ | 40 | 59 | 57 | 42 | 1709 | 1748 | 739 |
| Flux 40 $kW/m^2$ | 634 | 818 | 682 | 821 | 2457 | 3144 | 2300 |
| Flux 70 $kW/m^2$ | 2352 | 2276 | 1775 | 1790 | 2340 | 2650 | 2869 |
| Cumulative Smoke Released Prior to 15 min., $SMK/m^2$ in OSU RHR Cal: | | | | | | | |
| Flux 20 $kW/m^2$ | 74 | 101 | 84 | 81 | 2156 | 2372 | 1226 |
| Flux 40 $kW/m^2$ | 1082 | 1069 | 933 | 1100 | 2670 | 3194 | 2540 |
| Flux 70 $kW/m^2$ | 2767 | 2672 | 2130 | 2167 | 2441 | 2697 | 2918 |
| Maximum Rate of Heat Release (RHR) in $kW/m^2$ | | | | | | | |
| Flux 20 $kW/m^2$ | 56 | 60 | 49 | 36 | 163 | 140 | 109 |
| Flux 40 $kW/m^2$ | 74 | 67 | 55 | 65 | 198 | 178 | 147 |
| Flux 70 $kW/m^2$ | 68 | 65 | 75 | 67 | 161 | 187 | 155 |
| Maximum Rate of Smoke Release (RSR) in $SMK/min\text{-}m^2$ | | | | | | | |
| Flux 20 $kW/m^2$ | 39 | 42 | 34 | 16 | 262 | 257 | 126 |
| Flux 40 $kW/m^2$ | 141 | 117 | 103 | 126 | 406 | 552 | 386 |
| Flux 70 $kW/m^2$ | 339 | 320 | 265 | 256 | 496 | 569 | 541 |

*75 mil dumbells
+ Aged 7 days at 121° C.

EXAMPLES 18–24

Flame and smoke retardant compositions were prepared and evaluated as set forth in Examples 11–17. Examples 18 and 19 are commercially available compositions. Ingredients and results are set forth in Tables VI and VII, respectively.

TABLE VI

| Ingredients | Examples (amounts phr) 20 | 21 | 22 | 23 | 24 |
|---|---|---|---|---|---|
| PVC (GEON ® 26) | 100 | 100 | 100 | 100 | 100 |
| [1]CPE | 35 | 40 | 45 | 35 | 35 |
| Tetrabromophthlalic acid bis(2-ethylhexyl ester) | 5 | 10 | 15 | 10 | 10 |
| Polyurethane (ESTANE ® 5703) | 2 | 2 | 2 | 2 | 2 |
| Tribasic Pb sulfate | 8 | 8 | 8 | 8 | 8 |
| Dibasic Pb stearate | 0.5 | 0.5 | 0.5 | 0.5 | 0.5 |
| MgO | 1 | 1 | 1 | — | — |
| MgO/ZnO (solid solution of Zn Oxide in Mg Oxide) | — | — | — | 1 | 1 |

TABLE VI-continued

| Ingredients | Examples (amounts phr) 20 | 21 | 22 | 23 | 24 |
|---|---|---|---|---|---|
| Melamine Molybdate | 2 | 2 | 2 | 2 | 3 |
| $Sb_2O_3$ | 5 | 6 | 7 | 5 | 4 |
| Copper Oxalate | 1 | 1 | 1 | 1 | 2 |
| Ethylene bis Stearamide (EBS Wax) | 0.5 | 0.5 | 0.5 | 0.5 | 0.5 |

[1]DuPont CPE prepared by solution chlorination (36% Cl content, 110 ML (1 + 4) Mooney Viscosity @ 100° C.

TABLE VII

| Physical Property | Examples 18 | 19 | 20 | 21 | 22 | 23 | 24 |
|---|---|---|---|---|---|---|---|
| Specific Gravity | 1.31 | 1.36 | 1.44 | 1.43 | 1.43 | 1.44 | 1.44 |
| Oxygen Index | 23.6 | 29.3 | 50.8 | 48.6 | 46.6 | 50.3 | 51.4 |
| NBS Smoke (Dm/g) | | | | | | | |
| Flaming | 67.5 | 53.8 | 42.2 | 41.6 | 39.9 | 40.0 | 34.4 |
| Non-flaming | 49.1 | 38.6 | 23.8 | 27.1 | 28.3 | 28.9 | 24.3 |
| Brittleness Temp. (°C.) | −27 | −10.5 | −24.5 | −42 | −38 | −25.5 | −34 |
| Wedge Shear (lb/in) | 799 | 940 | 1999 | 1622 | 1553 | 1597 | 1664 |
| % Heat Distortion (1 Hr. @ 121° C. under 2000 g) | 26.2 | 17.4 | 14.3 | 17.1 | 19.3 | 19.7 | 12.0 |
| *Tensile Strength (psi) | 2787 | 3037 | 3678 | 3100 | 2795 | 3140 | 3278 |
| 100% Modulus (psi) | 1792 | 2360 | — | 3067 | 2732 | 3127 | 3270 |
| Yield Point (psi) | — | — | 3863 | — | — | — | — |
| % Elongation | 380 | 353 | 120 | 167 | 170 | 127 | 170 |
| +Aged Tensile Strength (psi) | 2750 | 2828 | 3848 | 3268 | 2877 | 3268 | 3447 |
| +Aged 100% Modulus (psi) | 2698 | 2472 | — | — | 2885 | 3292 | — |
| +Aged Yieldpoint (psi) | — | — | 4201 | 3359 | — | — | 3570 |
| +Aged % Elongation | 200 | 317 | 97 | 117 | 100 | 137 | 150 |
| % Retention Tensile Strength | 99 | 93 | 105 | 105 | 103 | 104 | 105 |
| % Retention Modulus yield pt. | 151 | 105 | 109 | 109 | 106 | 105 | 109 |
| % Retention Elongation | 53 | 90 | 81 | 70 | 59 | 108 | 88 |
| Volume Resistivity (dry ohm-cm) | $9.5 \times 10^{13}$ | $2.5 \times 10^{15}$ | $7.9 \times 10^{15}$ | $4.5 \times 10^{15}$ | $4.1 \times 10^{15}$ | $4.5 \times 10^{15}$ | $5.7 \times 10^{15}$ |
| DTS (min @ 50 RPM and 385° F.) | — | — | 3.75 | 5.0 | 5.75 | 5.2 | 4.25 |
| Melt Flow (mg/min-Short orifice, 175° C.) | — | — | 68 | 139 | 205 | 116 | 137 |
| Dielectric Constant @ 10 kHz | — | 3.7 | 3.7 | 3.7 | 3.95 | 3.7 | 3.6 |
| Cumulative Heat Released Prior to 5 min., $MJ/m^2$ in OSU RHR Cal: | | | | | | | |
| Flux 20 $kW/m^2$ | 26.4 | 9.5 | 0 | 0 | 0 | 0 | 0 |
| Flux 40 $kW/m^2$ | 52.5 | 41.7 | 5.5 | 5.9 | 7.2 | 5.3 | 4.0 |
| Flux 70 $kW/m^2$ | 44.2 | 43.2 | 18.3 | 16.5 | 19.1 | 19.2 | 16.7 |
| Cumulative Heat Released Prior to 10 min., $MJ/m^2$ in OSU RHR Cal: | | | | | | | |
| Flux 20 $kW/m^2$ | 69.5 | 42.2 | 0.6 | 0 | 0 | 0.1 | 0 |
| Flux 40 $kW/m^2$ | 94.5 | 71.8 | 21.0 | 23.9 | 26.7 | 20.6 | 14.1 |
| Flux 70 $kW/m^2$ | 63.2 | 61.9 | 36.2 | 33.6 | 39.2 | 38.7 | 33.8 |
| Cumulative Heat Released Prior to 15 min., $MJ/m^2$ in OSU RHR Cal: | | | | | | | |
| Flux 20 $kW/m^2$ | 101.2 | 75.5 | 2.1 | 0 | 0.5 | 1.5 | 0 |
| Flux 40 $kW/m^2$ | 107.8 | 80.5 | 37.4 | 38.1 | 46.3 | 35.8 | 26.0 |
| Flux 70 $kW/m^2$ | 69.7 | 68.5 | 48.6 | 43.9 | 53.1 | 52.7 | 46.1 |
| Cumulative Smoke Released Prior to 5 min., $SMK/m^2$ in OSU RHR Cal: | | | | | | | |
| Flux 20 $kW/m^2$ | 808 | 227 | 24 | 42 | 33 | 43 | 23 |
| Flux 40 $kW/m^2$ | 2039 | 1772 | 472 | 531 | 509 | 462 | 332 |
| Flux 70 $kW/m^2$ | 2391 | 2334 | 1518 | 1559 | 1695 | 1373 | 1246 |
| Cumulative Smoke Released Prior to 10 min., $SMK/m^2$ in OSU RHR Cal: | | | | | | | |
| Flux 20 $kW/m^2$ | 2010 | 777 | 48 | 88 | 63 | 83 | 41 |
| Flux 40 $kW/m^2$ | 2785 | 2399 | 965 | 1102 | 1200 | 909 | 698 |
| Flux 70 $kW/m^2$ | 2856 | 2731 | 2358 | 2521 | 2761 | 2157 | 1944 |
| Cumulative Smoke Released Prior to 15 min., $SMK/m^2$ in OSU RHR Cal: | | | | | | | |
| Flux 20 $kW/m^2$ | 2509 | 1440 | 76 | 137 | 98 | 126 | 60 |
| Flux 40 $kW/m^2$ | 2839 | 2440 | 1395 | 1496 | 1687 | 1327 | 974 |
| Flux 70 $kW/m^2$ | 2860 | 2742 | 2729 | 2885 | 3216 | 2551 | 2321 |
| Maximum Rate of Heat Release (RHR) in $kW/m^2$ | | | | | | | |
| Flux 20 $kW/m^2$ | 158 | 129 | 99 | 74 | 89 | 93 | 62 |
| Flux 40 $kW/m^2$ | 232 | 205 | 66 | 67 | 74 | 64 | 50 |
| Flux 70 $kW/m^2$ | 203 | 353 | 75 | 71 | 82 | 83 | 74 |
| Maximum Rate of Smoke Release (RSR) in SMK/min-$m^2$ | | | | | | | |
| Flux 20 $kW/m^2$ | 284 | 166 | 75 | 72 | 84 | 106 | 57 |
| Flux 40 $kW/m^2$ | 505 | 462 | 132 | 151 | 172 | 123 | 95 |
| Flux 70 $kW/m^2$ | 677 | 659 | 362 | 377 | 391 | 335 | 302 |

*75 mil dumbells
+ Aged 7 days at 121° C.

EXAMPLES 25-30A

Flame and smoke retardant compositions were again prepared as set forth in Examples 11-17. However, the base polymer utilized was chlorinated polyvinyl chloride. A PVC based composition (Example 25) was evaluated for comparative purposes. Ingredients and results are set forth in Tables VIII and IX, respectively.

TABLE VIII

| Ingredients | Examples Amounts (Phr) 25 | 26 | 27 | 28 | 29 | 30 | 30A |
|---|---|---|---|---|---|---|---|
| [1]CPVC | — | 100 | 100 | 100 | 100 | 100 | 100 |
| PVC (GEON 26) | 100 | — | — | — | — | — | — |
| [2]CPE | — | 75 | — | — | 75 | 75 | 75 |
| [3]CPE | 65 | — | 75 | — | — | — | — |
| [4]CPE | — | — | — | 75 | — | — | — |
| Polyurethane (ESTANE 5703) | 4 | 4 | 4 | 4 | 4 | 4 | 4 |
| Tri-isononyl Trimellitate | 4 | 4 | 4 | 4 | 4 | 4 | — |
| Tetrabromophthalic Acid acid bis (2-ethylhexyl ester) | — | — | — | — | — | — | 10 |
| Tribiasic Pb sulfate | 8 | 9 | 9 | 9 | 9 | 9 | 9 |
| Dibasic Pb stearate | 0.5 | 0.7 | 0.7 | 0.7 | 0.7 | 0.7 | 0.7 |
| $Sb_2O_3$ | 5 | 5 | 5 | 5 | — | 5 | 9 |
| Melamine Molybdate | 3 | 3 | 3 | 3 | — | — | 3 |
| Copper Oxalate | 2 | 0.5 | 0.5 | 0.5 | — | — | — |
| Molybdic Oxide | — | — | — | — | 4 | 4 | — |
| $TiO_2$ | — | — | — | — | — | — | 1 |
| EBS Wax | 0.5 | 0.5 | 0.5 | 0.5 | 0.5 | 0.5 | — |
| Oxidized Polyethylene | — | — | — | — | — | — | 0.25 |
| Stearic Acid | — | — | — | — | — | — | 0.5 |

[1]TEMPRITE 674 × 571 (67% Cl Content) B F Goodrich
[2]DuPont CPE (prepared by solution chlorination 36% Cl content, 110 ML (1 + 4) Mooney viscosity @ 100° C.)
[3]DuPont CPE (prepared by solution chlorination 36% Cl content, 65 ML (1 + 4) Mooney viscosity @ 100° C.)
[4]TYRIN CMO 136 resin (36% Cl content, 21.6 KP)

TABLE IX

| Physical Property | Examples 25 | 26 | 27 | 28 | 29 | 30 | 30A |
|---|---|---|---|---|---|---|---|
| Specific Gravity | 1.37 | 1.43 | 1.43 | 1.45 | 1.41 | 1.44 | 1.49 |
| Oxygen Index | 45.2 | 47.6 | 46.4 | 48.4 | 44.8 | 48.0 | 49.4 |
| NBS Smoke (Dm/g) | | | | | | | |
| Flaming | 39.4 | 30.9 | 29.1 | 32.5 | 28.2 | 25.9 | 24.2 |
| Non-flaming | 30.6 | 20.6 | 25.6 | 19.7 | 22.1 | 21.6 | 24.5 |
| Brittleness Temp. (°C.) | −45 | −44.5 | −25.5 | −41 | −45.5 | −39.5 | −45.5 |
| Wedge Shear (lb/in) | 1223 | 1287 | 919 | 1143 | 1147 | 1281 | 1322 |
| % Heat Distortion (1 Hr. @ 121° C. under 2000 g) | 23.9 | 25.9 | 29.3 | 25.2 | 30 | 37.4 | 35.3 |
| *Tensile Strength (psi) | 2526 | 2815 | 2319 | 2760 | 2903 | 2895 | 3077** |
| 100% Modulus (psi) | 2537 | 2578 | 2362 | 2622 | 2850 | 2860 | 2907 |
| % Elongation | 103 | 143 | 100 | 110 | 110 | 107 | 130 |
| +Aged Tensile Strength | 2735 | 3548 | 2767 | 3468 | 3015 | 3225 | 3225 |
| +Aged 100% Modulus | 2753 | — | — | — | 3013 | 3153 | 3125 |
| +Aged % Elongation | 100 | 80 | 47 | 33 | 100 | 105 | 127 |
| % Retention Tensile Strength | 108 | 126 | 119 | 126 | 104 | 111 | 105 |
| % Retention Modulus | 109 | — | — | — | 106 | 110 | 107 |
| % Retention Elongation | 97 | 56 | 47 | 30 | 91 | 98 | 100 |
| Volume Resistivity (dry, ohm-cm) | $6.4 \times 10^{14}$ | $1.4 \times 10^{14}$ | $6.9 \times 10^{13}$ | $1.6 \times 10^{14}$ | $1.5 \times 10^{15}$ | $4.0 \times 10^{15}$ | $1.4 \times 10^{15}$ |
| DTS (min @ 40 RPM and 375° F.) | >30 | 1.75 | — | 2.25 | 3.5 | 3.75 | 1.25++ |
| Melt Flow (mg/min-Short Orifice, 175° C.) | — | 8.9 | 87.2 | 25.0 | 174 | 140 | 108 |
| Cumulative Heat Released Prior to 5 min., $MJ/m^2$ in OSU RHR Cal: | | | | | | | |
| Flux 20 $kW/m^2$ | 0.85 | 0.3 | 0.1 | 0.0 | 0.3 | 0.05 | 0.0 |
| Flux 40 $kW/m^2$ | 5.1 | 4.5 | 1.2 | 2.1 | 3.6 | 1.1 | 2.3 |
| Flux 70 $kW/m^2$ | 14.8 | 20.0 | 11.2 | 11.7 | 13.7 | 8.8 | 11.0 |
| Cumulative Heat Released Prior to 10 min., $MJ/m^2$ in OSU RHR Cal: | | | | | | | |
| Flux 20 $kW/m^2$ | 3.1 | 1.9 | 0.7 | 0.15 | 1.5 | 0.7 | 0.0 |
| Flux 40 $kW/m^2$ | 15.1 | 15.2 | 5.7 | 8.6 | 13.0 | 5.3 | 8.0 |
| Flux 70 $kW/m^2$ | 31.1 | 48.7 | 25.2 | 30.6 | 32.8 | 24.3 | 29.0 |
| Cumulative Heat Released Prior to 15 min., $MJ/m^2$ in OSU RHR Cal: | | | | | | | |
| Flux 20 $kW/m^2$ | 6.2 | 3.9 | 1.6 | 1.0 | 3.1 | 3.1 | 0.7 |
| Flux 40 $kW/m^2$ | 49.7 | 33.2 | 15.8 | 19.6 | 28.4 | 11.9 | 18.0 |
| Flux 70 $kW/m^2$ | 47.0 | 69.9 | 39.0 | 43.3 | 48.9 | 39.3 | 44.0 |
| Cumulative Smoke Released Prior to 5 min., $SMK/m^2$ in OSU RHR Cal: | | | | | | | |
| Flux 20 $kW/m^2$ | 37 | 9 | 39 | 10 | 39 | 44 | 9.5 |
| Flux 40 $kW/m^2$ | 50 | 27 | 20 | 24 | 46 | 66 | 154 |
| Flux 70 $kW/m^2$ | 326 | 111 | 71 | 44 | 112 | 81 | 311 |
| Cumulative Smoke Released Prior to 10 min., $SMK/m^2$ in OSU RHR Cal: | | | | | | | |
| Flux 20 $kW/m^2$ | 62 | 20 | 88 | 27 | 98 | 55 | 24 |

TABLE IX-continued

| Physical Property | Examples 25 | 26 | 27 | 28 | 29 | 30 | 30A |
|---|---|---|---|---|---|---|---|
| Flux 40 kW/m$^2$ | 116 | 70 | 46 | 66 | 104 | 166 | 350 |
| Flux 70 kW/m$^2$ | 561 | 311 | 131 | 102 | 223 | 180 | 709 |
| Cumulative Smoke Released Prior to 15 min., SMK/m$^2$ in OSU RHR Cal: | | | | | | | |
| Flux 20 kW/m$^2$ | 87 | NR | 159 | 50 | 151 | 58 | 46 |
| Flux 40 kW/m$^2$ | 266 | 120 | 81 | 120 | 171 | 318 | 588 |
| Flux 70 kW/m$^2$ | 757 | 490 | 198 | 154 | 326 | 269 | 1066 |
| Maximum Rate of Heat Release (RHR) in kW/m$^2$ | | | | | | | |
| Flux 20 kW/m$^2$ | 43 | 52 | 68 | 66 | 67 | 43 | 18 |
| Flux 40 kW/m$^2$ | 58 | 100 | 51 | 50 | 60 | 44 | 42 |
| Flux 70 kW/m$^2$ | 63 | 223 | 55 | 72 | 156 | 61 | 64 |
| Maximum Rate of Smoke Release (RSR) in SMK/min-m$^2$ | | | | | | | |
| Flux 20 kW/m$^2$ | 15 | 8 | 22 | 28 | 33 | 29 | 12 |
| Flux 40 kW/m$^2$ | 26 | 18 | 14 | 17 | 22 | 57 | 55 |
| Flux 70 kW/m$^2$ | 83 | 34 | 29 | 19 | 39 | 23 | 101 |

*75 mil dumbells
**35 mil dumbells
+ Oven Aged 7 days at 121° C.
++ Min @ 50 RPM and 385° F.

EXAMPLES 31-35

These examples illustrate the use of terpolymers of ethylene/vinyl acetate/carbon monoxide (E/VA/CO) and acrylonitrile butadiene rubber (NBR) as flexibilizers in the present invention. E/VA/CO terpolymers are commercially available under the ELVALOY® trademark sold by E.I. DuPont deNemours & Co. Nitrile butandiene rubbers are commercially available under the HYCAR® trademark from BFGoodrich. The compositions were prepared as set forth in Examples 11-17. A state of the art primary insulation compound (Example 31) was evaluated for comparative purposes. Ingredients and results are set forth below in Tables X and XI, respectively.

TABLE X

| Ingredients | Examples Amounts in phr 32 | 33 | 34 | 35 |
|---|---|---|---|---|
| PVC (GEON ® 26) | 100 | 100 | 100 | 100 |
| [1]CPE | 22 | 22 | 22 | 15 |
| [2]E/VA/CO | 22 | — | — | 14 |
| [3]NBR | — | 22 | — | — |
| [4]NBR | — | — | 22 | 15 |
| [5]Phosphate Plasticizer | 4 | 4 | 4 | 4 |
| [6]Antioxidant | 0.5 | 0.5 | 0.5 | 0.5 |
| Tribasic Pb sulfate | 8 | 8 | 8 | 8 |
| Dibasic Pb stearate | 0.4 | 0.4 | 0.4 | 0.4 |
| $Sb_2O_3$ | 3 | 3 | 3 | 3 |
| MgO/ZnO (solid solution of Zn Oxide in Mg Oxide) | 2 | 2 | 2 | 2 |
| $CaCO_3$ (0.07) | 10 | 10 | 10 | 10 |
| [7]$Al_2O_3$ (1.3) | 10 | 10 | 10 | 10 |
| EBS Wax | 0.4 | 0.4 | 0.4 | 0.4 |

[1]TYRIN ® 3611 (Dow)
[2]ELVALOY ® 742 (DuPont)
[3]CHEMIGUM ® P-83 acrylonitrile/butadiene elastomer (Goodyear)
[4]HYCAR ® 1422 × 14 acrylonitrile/butadiene
[5]SANTICIZER ® 148
[6]TOPANOL ® CA (ICI Americas, Inc.) 3-methyl-6-t butylphenol/crotoaldehyde
[7]ZEEOSPHERES ® 200 (Zeelan Industries, Inc.) silica-alumina ceramic

TABLE XI

| Physical Property | Examples 31 | 32 | 33 | 34 | 35 |
|---|---|---|---|---|---|
| Specific Gravity | 1.35 | 1.45 | 1.45 | 1.45 | 1.43 |
| Oxygen Index | 33.4 | 42.0 | 45.0 | 44.6 | 41.8 |
| NBS Smoke (Dm/g) | | | | | |
| Flaming | 45.2 | 34.8 | 47.0 | 50.7 | 40.4 |
| Non-Flaming | 37.7 | 16.6 | 22.3 | 21.6 | 22.3 |
| Brittleness Temp. (°C.) | −7 | −4 | −4 | −15 | −11 |
| *Tensile Strength (psi) | 3133 | 2860 | 3087 | 3022 | 2720 |
| Yield Point (psi) | 3513 | 3492 | 3542 | 3467 | 3392 |
| % Elongation | 250 | 113 | 240 | 227 | 200 |
| +Aged Tensile Strength (psi) | 3130 | 3532 | 3742 | 3783 | 3702 |
| +Aged Yield point (psi) | 3538 | 4102 | 4352 | 4415 | 4347 |
| +Aged % Elongation | 253 | 77 | 50 | 60 | 95 |
| % Retention Tensile Strength | 100 | 123 | 121 | 125 | 136 |
| % Retention Elongation | 101 | 68 | 21 | 26 | 48 |
| Volume Resistivity (dry, ohm-cm) | $1.7 \times 10^{15}$ | $2.8 \times 10^{15}$ | $3.3 \times 10^{15}$ | $0.5 \times 10^{15}$ | $1.6 \times 10^{15}$ |
| Dielectric Constant 10 kHz | 3.1 | 3.5 | 3.8 | 3.8 | 3.65 |
| Cumulative Heat Released Prior to 5 min., MJ/m$^2$ in OSU RHR Cal: | | | | | |
| Flux 20 kW/m$^2$ | 4.9 | 1.4 | 0.2 | 1.0 | 1.1 |
| Flux 40 kW/m$^2$ | 13.5 | 8.3 | 6.6 | 7.0 | 7.0 |
| Flux 70 kW/m$^2$ | 14.8 | 16.6 | 18.4 | 16.7 | 14.4 |
| Cumulative Heat Released Prior to 10 min., MJ/m$^2$ in OSU RHR Cal: | | | | | |
| Flux 20 kW/m$^2$ | 19.6 | 2.9 | 2.7 | 3.9 | 5.4 |
| Flux 40 kW/m$^2$ | 28.4 | 20.2 | 19.6 | 21.4 | 19.7 |
| Flux 70 kW/m$^2$ | 27.4 | 30.2 | 33.9 | 31.4 | 32.3 |
| Cumulative Heat Released Prior to 15 min., MJ/m$^2$ in OSU RHR Cal: | | | | | |
| Flux 20 kW/m$^2$ | 30.5 | 0.5 | 8.8 | 14.5 | 12.9 |

TABLE XI-continued

| Physical Property | Examples 31 | 32 | 33 | 34 | 35 |
|---|---|---|---|---|---|
| Flux 40 kW/m² | 34.1 | 31.9 | 26.1 | 27.8 | 25.7 |
| Flux 70 kW/m² | 33.6 | 33.0 | 38.5 | 33.6 | 37.7 |
| Cumulative Smoke Released Prior to 5 min., SMK/m² in OSU RHR Cal: | | | | | |
| Flux 20 kW/m² | 297 | 84 | 150 | 123 | 74 |
| Flux 40 kW/m² | 564 | 415 | 540 | 665 | 630 |
| Flux 70 kW/m² | 1430 | 1371 | 1870 | 1882 | 1486 |
| Cumulative Smoke Released Prior to 10 min., SMK/m² in OSU RHR Cal: | | | | | |
| Flux 20 kW/m² | 918 | 178 | 533 | 475 | 427 |
| Flux 40 kW/m² | 1313 | 850 | 1575 | 1789 | 1563 |
| Flux 70 kW/m² | 1992 | 1947 | 2623 | 2691 | 2455 |
| Cumulative Smoke Released Prior to 15 min., SMK/m² in OSU RHR Cal: | | | | | |
| Flux 20 kW/m² | 1275 | 275 | 1082 | 1207 | 1001 |
| Flux 40 kW/m² | 1747 | 1278 | 1859 | 2060 | 1820 |
| Flux 70 kW/m² | 2181 | 2088 | 2692 | 2771 | 2479 |
| Maximum Rate of Heat Release (RHR) in kW/m² | | | | | |
| Flux 20 kW/m² | 59 | 9 | 30 | 46 | 33 |
| Flux 40 kW/m² | 73 | 46 | 54 | 59 | 50 |
| Flux 70 kW/m² | 77 | 79 | 93 | 85 | 78 |
| Maximum Rate of Smoke Release (RSR) in SMK/min-m² | | | | | |
| Flux 20 kW/m² | 146 | 20 | 141 | 201 | 146 |
| Flux 40 kW/m² | 1120 | 107 | 281 | 301 | 246 |
| Flux 70 kW/m² | 436 | 355 | 543 | 580 | 475 |

*75 mil dumbells
+ Oven Aged 7 days at 121° C.

EXAMPLES 36-43

These examples demonstrate the reduced hydrogen halide acid gas evolution of the compositions of the present invention. Acid gas evolution was determined as the percent available chlorine released as HCl in the Helical Coil Test previously described. Ingredients and results are set forth below in Tables XII and XIII, respectively. Examples 36 and 37 are control samples.

TABLE XII

| Ingredients | Examples Amounts phr 36 | 37 | 38 | 39 | 40 | 41 | 42 | 43 |
|---|---|---|---|---|---|---|---|---|
| PVC (GEON ® 26) | — | 100 | — | — | 100 | 100 | 100 | 100 |
| (GEON ® 30) | 100 | — | 100 | 100 | — | — | — | — |
| CPE (TYRIN 3611) | 6 | 5 | 6 | 6 | 5 | 5 | 5 | 5 |
| Diundecyl phthalate | — | 30 | — | — | 30 | 30 | 30 | 30 |
| 7,9,11phthalate | 68 | — | 68 | 68 | — | — | — | — |
| NBR | 6 | — | 6 | 6 | — | — | — | — |
| Tribasic Pb sulfate | 7 | 5 | 7.5 | 7.5 | 5 | 5 | 5 | 5 |
| Dibasic Pb stearate | 0.9 | 0.5 | 0.75 | 0.75 | 0.5 | 0.5 | 0.5 | 0.5 |
| $Sb_2O_3$ | 5 | 5 | 5 | 5 | 5 | 5 | 5 | 5 |
| $CaCO_3$ (.07 microns) | — | — | 110 | 100 | — | 60 | 80 | 100 |
| $CaCO_3$ (3.5 microns) | — | — | — | — | 100 | — | — | — |
| Stearic Acid | — | — | 2.5 | 2.5 | — | — | — | — |
| EBS Wax | — | 0.5 | — | — | 0.5 | 0.5 | 0.5 | 0.5 |

TABLE XIII

| Physical Property | Examples 36 | 37 | 38 | 39 | 40 | 41 | 42 | 43 |
|---|---|---|---|---|---|---|---|---|
| Specific Gravity | 1.26 | 1.33 | 1.54 | 1.51 | 1.68 | 1.56 | 1.62 | 1.67 |
| Oxygen Index | 26.8 | 31.7 | 19.8 | 20.4 | 30.5 | 28.3 | 27.0 | 23.6 |
| NBS Smoke (Dm/g) | | | | | | | | |
| Flaming | 90.8 | 78.9 | 27.9 | 28.4 | 32.3 | 41.9 | 27.3 | 15.0 |
| Non-Flaming | 56.7 | 33.7 | 40.5 | 38.2 | 23.3 | 23.4 | 22.0 | 18.8 |
| % Available Cl Released | 87.3 | 95.6 | 3.0 | 4.0 | 58.5 | 28 | 9 | 2.5 |

What is claimed is:

1. A low smoke and flame retardant cable comprising at least one insulated conductor said conductor being enclosed in a protective jacket and said jacket comprising: (a) 110 to 140 phr by weight of a flexibilized base polymer, said flexibilized base polymer comprising polyvinyl chloride polymerized in the presence of a flexibilizing agent selected from the group consisting of chlorinated polyethylene, copolymers of ethylene/vinyl acetate, terpolymers of ethylene/vinyl acetate/carbon monoxide and mixtures thereof, and said flexibilizing agent being soluble in vinyl chloride monomer; (b) optionally 5 to 100 phr by weight of additional flexibilizing agent; (c) 2 to 15 phr by weight of at least one lead salt stabilizer; (d) flame and/or smoke suppressing amounts of a flame and/or smoke suppressant compound selected from the group consisting of antimony trioxide, aluminum trihydrate, solid solution of zinc oxide in magnesium oxide, melamine molybdate, copper oxalate, magnesium carbonate, magnesium hydroxide, calcium carbonate, zinc borate, molybdic oxide, alumina ceramic spheres and mixtures thereof; and (e) 20 to 60 phr by weight of a brominated phthalic acid ester plasticizer, 2. The cable of claim 1, wherein the flexibilized base polymer of said jacket composition comprises 100 phr by weight polyvinyl chloride; 10 to 35 phr by weight or said flexibilizing agent and 1 to 3 phr by weight expoxidized soybean oil.

3. The cable of claim 1, wherein the optional flexibilizing agent of said jacket composition is selected from the group consisting of chlorinated polyethylene, copolymers of ethylene/vinyl acetate, terpolymers of ethylene/vinyl acetate/carbon monoxide and mixtures thereof.

4. The cable of claim 1, wherein the chlorinated polyethylene in said jacket composition is highly branched and prepared by solution chlorination.

5. The cable of claim 1, wherein said jacket composition further comprises 1 to 150 phr of at least one smoke suppressing filler.

6. The cable of claim 1, wherein said jacket composition has a maximum rate of heat release at 10 or more min. of 100 $kW/m^2$ or less and a maximum rate of smoke release at 10 or more min. of 100 SMK/min.-$m^2$ or less as measured by the OSU RHR calorimeter.

7. The cable of claim 1, wherein the jacket composition has a cumulative heat release of 5 $MJ/m^2$ or less and a cumulative smoke release of 200 $SMK/m^2$ or less, and further having a maximum rate of heat release at 10 or more min. of 55 $KW/m^2$ or less and a maximum rate of smoke release at 10 or more min. of 50 SMK/min.-$m^2$ or less.

8. The cable of claim 1, wherein the jacket composition has a cumulative heat release of 3.5 $MJ/m^2$ or less, a cumulative smoke release of 100 $SMK/m^2$ or less, a maximum rate of heat release of 20 $kW/m^2$ or less and a maximum rate of smoke release of 25 $SMK/m^2$-min. or less.

9. The cable of claim 1, wherein the jacket composition has a cumulative heat and smoke release at flux 70 $kW/m^2$ prior to 15 min. of 50 $MJ/m^2$ and 1100 $SMK/m^2$, or less, respectively, and having a maximum rate of heat and smoke release at 2 or more min. of 75 $kW/m^2$ and 105 $SMK/m^2$-min. or less, respectively.

10. The insulation composition of claim 1 further comprising at least one lubricant, pigment compound, filler, processing aid and mixtures thereof.

11. The cable of claim 10, wherein the jacket composition further comprises at least one lubricant, pigment compound, filler, processing aid and mixtures thereof.

12. The cable of claim 1, wherein the insulation on the insulated conductor comprises (a) 110 to 140 phr by weight of a flexibilized base polymer, said flexibilized base polymer comprising polyvinyl chloride polymerized in the presence of a flexibilizing agent selected from the group consisting of chlorinated polyethylene, copolymers of ethylene/vinyl acetate, terpolymers of ethylene/vinyl acetate/carbon monoxide and mixtures thereof, and said flexibilizing agent being soluble in vinyl chloride monomer; (b) optionally, 5 to 100 phr by weight of additional flexibilizing agent; (c) 2 to 15 phr by weight of at least one lead salt stabilizer; (d) flame and/or smoke suppressing amounts of a flame and/or smoke suppressant compound selected from the group consisting of antimony trioxide, aluminum trihydrate, solid solution of zinc oxide in magnesium oxide, melamine molybdate, copper oxalate magnesium carbonate, magnesium hydroxide, calcium carbonate, zinc borate, molybdic oxide, alumina ceramic spheres and mixtures thereof, (a) 20 to 60 phr by weight of a brominated phthalic acid ester plasticizer.

13. An insulated conductor wherein said conductor is enclosed in low smoke and flame retardant insulation and said insulation comprises: (a) 110 to 140 phr by weight of a flexibilized base polymer, said flexibilized base polymer comprising polyvinyl chloride polymerized in the presence of a flexibilizing agent selected from the group consisting of chlorinated polyethylene, copolymers of ethylene/vinyl acetate, terpolymers of ethylene/vinyl acetate/carbon monoxide and mixtures thereof, and said flexibilizing agent being soluble in vinyl chloride monomer; (b) optionally, 5 to 100 phr by weight of additional flexibilizing agent; (c) 2 to 15 phr by weight of at least one load salt stabilizer; (d) flame and/or smoke suppressing amounts of a flame and/or smoke suppressant compound selected from the group consisting of ahtlmony trioxide, aluminum trihydrate, solid solution of zinc oxide in magnesium oxide, melamine molybdate, copper oxalate, magnesium carbonate, magnesium hydroxide, calcium carbonate, zinc borate, molybidc oxide, alumina ceramic spheres and mixtures thereof; (e) 20 to 60 phr by weight of a brominated phthalic acid ester plasticizer.

14. The insulated conductor of claim 1, wherein said insulation further comprises at least one lubricant, pigment compound, filler, processing aid and mixtures thereof.

15. The cable of claim 1, wherein said jacket composition is characterized by the following properties:

(i) cumulative heat released at flux 20 $kW/m^2$ prior to 15 min. of 10 $MJ/m^2$ or less as measured by the OSU RHR calorimeter; and (ii) cumulative smoke released at flux 20 $kW/m^2$ prior to 15 min. of 400 $SMK/m^2$ or less as measured by the OSU RHR calorimeter.

16. The cable of claim 1 wherein the chlorinated polyethylene flexibilizing agent of said jacket composition has a chlorine content between about 28 to 38 weight percent and a Mooney viscosity (ML (1+4) at 100° C.) range between about 20 and 110.

17. The cable of claim 1, wherein the chlorinated polyethylene of said jacket composition is selected from the group consisting of heterogeneously chlorinated polyethylene, solution chlorinated polyethylene and mixtures thereof.

18. The cable of claim 12, wherein the optional flexibilizing agent or said insulation composition is selected from the group consisting of chlorinated polyethylene, copolymers of ethylene/vinyl acetate, terpolymers of ethylene/vinyl acetate/carbon monoxide and mixtures thereof.

19. The cable of claim 12, wherein the chlorinated polyethylene flexibilizing agent of said insulation composition has a chlorine content between about 28 to 38 weight percent and a Mooney viscosity (ML (1+4) at 100° C.) range between about 20 and 110.

20. The cable of claim 12, wherein the chlorinated polyethylene of said insulation composition is selected from the group consisting of heterogeneously chlorinated polyethylene, solution chlorinated polyethylene and mixtures thereof.

21. The conductor of claim 13, wherein the chlorinated polyethylene flexibilizing agent of said insulation composition has a chlorine content between about 28 to 38 weight percent and a Mooney viscosity (ML (1+4) at 100° C.) range between about 20 and 110.

22. The conductor of claim 13, wherein the chlorinated polyethylene of said insulation composition is selected from the group consisting of heterogeneously chlorinated polyethylene, solution chlorinated polyethylene and mixtures thereof.

* * * * *